US012780727B1

(12) United States Patent
Boul et al.

(10) Patent No.: US 12,780,727 B1
(45) Date of Patent: Nov. 3, 2026

(54) ADMIXTURES FOR CEMENT-BASED PRODUCTS

(71) Applicant: Lyten, Inc., San Jose, CA (US)

(72) Inventors: Peter J. Boul, Emerald Hills, CA (US); Ariful Hasnat, San Jose, CA (US); Tony Silvis, Indianapolis, IN (US); Saemi Oh Poelma, Sunnyvale, CA (US); Salik Khan, Santa Clara, CA (US); Margaret Hines, San Jose, CA (US); Anne Ruminski, Redwood City, CA (US); Jacques F. Nicole, Palo Alto, CA (US)

(73) Assignee: Lyten, Inc., San Jose, CA (US)

( * ) Notice: Subject to any disclaimer, the term of this patent is extended or adjusted under 35 U.S.C. 154(b) by 0 days.

(21) Appl. No.: 19/442,125

(22) Filed: Jan. 7, 2026

Related U.S. Application Data

(60) Provisional application No. 63/850,378, filed on Jul. 24, 2025.

(51) Int. Cl.
*C04B 7/02* (2006.01)
*C04B 7/14* (2006.01)
(Continued)

(52) U.S. Cl.
CPC .................. *C04B 7/02* (2013.01); *C04B 7/14* (2013.01); *C04B 14/022* (2013.01);
(Continued)

(58) Field of Classification Search
CPC ........... C04B 7/02; C04B 7/14; C04B 24/226; C04B 24/24; C04B 40/0028;
(Continued)

(56) References Cited

U.S. PATENT DOCUMENTS

| | | | |
|---|---|---|---|
| 9,862,602 B1 | 1/2018 | Riso et al. | |
| 11,919,809 B2 | 3/2024 | Cracian et al. | |

(Continued)

FOREIGN PATENT DOCUMENTS

| | | |
|---|---|---|
| CN | 108191340 A | 6/2018 |
| CN | 108862265 A | 11/2018 |

(Continued)

OTHER PUBLICATIONS

Machine Translation of CN-112010581-B (Year: 2021).*

(Continued)

*Primary Examiner* — Amber R Orlando
*Assistant Examiner* — Sarah Catherine Case
(74) *Attorney, Agent, or Firm* — Paradice & Li LLP

(57) ABSTRACT

Liquid admixtures for cement-based products may include one or more of calcium-silicate-hydrates (C-S-H), calcium-aluminum-silicate-hydrates (C-A-S-H), 3-dimensional graphene carbons (3DG carbons) and water. Liquid admixtures for cement-based products may include one or more of zinc modulated C-S-H, C-A-S-H, 3DG carbons and water. The 3DG carbons may include flaky graphene and nodular graphene. High performance concrete (HPC) formulations free of silica fume and including slag, calcium-silicate-hydrates (C-S-H), calcium-aluminum-silicate-hydrates (C-A-S-H), 3-dimensional graphene carbons (3DG carbons) at a silica fume replacement level of approximately 8 wt %.

25 Claims, 23 Drawing Sheets

(51) Int. Cl.

| | |
|---|---|
| ***C04B 14/02*** | (2006.01) |
| ***C04B 24/22*** | (2006.01) |
| ***C04B 24/24*** | (2006.01) |
| ***C04B 40/00*** | (2006.01) |
| *C04B 103/32* | (2006.01) |
| *C04B 111/10* | (2006.01) |

(52) U.S. Cl.
CPC ............ *C04B 24/226* (2013.01); *C04B 24/24* (2013.01); *C04B 40/0028* (2013.01); *C04B 2103/32* (2013.01); *C04B 2111/1056* (2013.01); *C04B 2201/20* (2013.01); *C04B 2201/52* (2013.01)

(58) Field of Classification Search
CPC ......... C04B 2103/32; C04B 2111/1056; C04B 2201/20; C04B 22/04; C04B 2201/52; C08K 2003/0893
See application file for complete search history.

(56) References Cited

U.S. PATENT DOCUMENTS

| | | | |
|---|---|---|---|
| 2015/0152314 | A1 | 6/2015 | Muthusamy et al. |
| 2019/0315654 | A1 | 10/2019 | Balachandra |
| 2021/0355041 | A1 | 11/2021 | Fulton et al. |
| 2024/0010555 | A1 | 1/2024 | Poelma et al. |

FOREIGN PATENT DOCUMENTS

| | | | | | |
|---|---|---|---|---|---|
| CN | 112268933 | A | | 1/2021 | |
| CN | 112341123 | A | | 2/2021 | |
| CN | 113003995 | A | | 6/2021 | |
| CN | 112010581 | B | * | 11/2021 | |
| CN | 113979707 | A | | 1/2022 | |
| CN | 115231880 | A | | 10/2022 | |
| KR | 101964367 | B1 | | 4/2019 | |
| WO | 2018/148043 | A1 | | 8/2018 | |
| WO | 2020/209975 | A1 | | 10/2020 | |
| WO | 2023/168263 | A2 | | 9/2023 | |
| WO | WO-2025054564 | A2 | * | 3/2025 | ............. C04B 28/14 |

OTHER PUBLICATIONS

Hebei Sancolo Chemical Co., "Explained Polycarboxylic Acid Water Reducer", p. 1. <https://www.sancolo.com/news/explained-polycarboxylic-acid-water-reducer.html>. (Year: 2023).*
Morales-Melgares, et al., "Atomic-Level Structure of Zinc-Modified Cementitious Calcium Silicate Hydrate", Journal of the American Chemical Society, p. 22915-22924. (Year: 2022).*
Du, H. et al., "Improvement in concrete resistance against water and chloride ingress by adding graphene nanoplatelet", Cement and Concrete Research, Pergamon Press, Elmsford, NY, vol. 83, Mar. 2, 2016; pp. 114-123.
First Examination Report, EP Serial No. 23713252.7 dated Nov. 26, 2025; 13 pages.
Galpaya, D. et al., "Recent Advances in Fabrication and Characterization of Graphene-Polymer Nanocomposites", Graphene, vol. 1, No. 2, Oct. 2012; pp. 30-49.
Gartner, E., "Industrially interesting approaches to "low-CO2" cements", Cement and Concrete Research; vol. 34; Jan. 20, 2004; pp. 1489-1498.
Ghannam, M., "Proposed models for concrete thermal expansion with different aggregate types and saturation conditions", SN Appl. Sci., vol. 1, No. 425 (2019).
Hu, M. et al., "Effect of characteristics of chemical combined of graphene oxide-nanosilica nanocomposite fillers on properties of cement-based materials", Construction and Building Materials; vol. 225; Jul. 26, 2019; pp. 745-753.
International Search Report and Written Opinion dated Jul. 3, 2023 for PCT Appl. No. PCT/US2023/063476; 17 pages.
International Search Report and Written Opinion dated Jul. 25, 2025 for PCT Appl. No. PCT/US2024/045741; 27 pages.
Juenger, M. et al., "Supplementary cementitious materials: New sources, characterization, and performance insights", Cement and Concrete Research; vol. 122; May 22, 2019; pp. 257-273.
Krishna, R.S. et al., "The role of graphene and its derivatives in modifying different phases of geopolymer composites: A review", Construction and Building Materials, Elsevier, Netherlands; vol. 306; Sep. 21, 2021; 21 pages.
Li, X. et al., "Incorporation of graphene oxide and silica fume into cement paste: A study of dispersion and compressive strength", Construction and Building Materials; vol. 123; Jul. 15, 2016; pp. 327-335.
Lin, J. et al., "Dispersion of graphene oxide-silica nanohybrids in alkaline environment for improving ordinary Portland cement composites", Cement and Concrete Composites, Elsevier Applied Science, Barking, GB; vol. 106; Dec. 12, 2019; 9 pages.
Ma, Y. et al., "Three-dimensional graphene networks: synthesis, properties and applications", National Science Review, vol. 2, No. 1; Dec. 17, 2014; pp. 40-53.
Mulyana, Y. et al., "Reversible Oxidation of Graphene Through Ultraviolet/Ozone Treatment and Its Nonthermal Reduction through Ultraviolet Irradiation", The Journal of Physical Chemistry C, vol. 118, No. 47; Nov. 26, 2014; pp. 27372-27381.
Schneider, M., "The cement industry on the way to a low-carbon future", Cement and Concrete Research, vol. 124; Aug. 20, 2019; 19 pages.
Schonlein, M. et al., "A TEM study on the very early crystallization of C—S—H in the presence of polycarboxylate superplasticizers: Transformation from initial C—S—H globules to nanofoils", Cement and Concrete Research; vol. 106; Feb. 3, 2018; pp. 33-39.
Schulte, J. et al., "Graphene-reinforced cement composites for smart infrastructure systems", The Rise of Smart Cities, Ch. 4; Elsevier, Inc.; 2022; pp. 79-114.
Scrivener, K. et al., "Eco-efficient cements: Potential economically viable solutions for a low-CO2 cement-based materials industry", Cement and Concrete Research; vol. 114; Jun. 28, 2018; pp. 2-26.
Singh, V. et al., "Probing thermal expansion of graphene and modal dispersion at low-temperature using graphene nanoelectromechanical systems resonators", Nanotechnology, vol. 23, 165204 (2010).
Vizcaino-Andres, L. et al., "Industrial trial to produce a low clinker, low carbon cement", Materiales de Construccion; vol. 65, Issue 317; Jan.-Mar. 2015; available online Jan. 29, 2015; 11 pages.
Wang, X. et al., "One pot facile transformation of CO2 to an unusual 3-D nano-scaffold morphology of carbon", Scientific Reports; vol. 10, No. 1; Dec. 9, 2020; 12 pages.
Wong, J. et al., "Cementitious, Pozzolanic and Filler Materials for DSM Binders", Civil Engineering Journal, vol. 6, No. 2; Mar. 27, 2020; pp. 402-417.
Ying, J. et al., "Microstructure and Chloride Diffusion Properties of Hardened Fly Ash Cement Paste with Three-dimensional Graphene", Intl. Journal of Concrete Structures and Materials, vol. 16, No. 1; Jan. 28, 2022; 13 pages.
Ying, J. et al., "Synergistic effects of three-dimensional graphene and silica fume on mechanical and chloride diffusion properties of hardened cement paste", Construction and Building Materials, vol. 316, No. 125756; Dec. 6, 2021; 12 pages.
Ying, J. et al., "Microstructure, Mechanics, and Chloride Diffusion of Three-Dimensional Graphene Reinforced Cement Paste", J. Mater. Civ. Eng., vol. 35, No. 4; ASCE; Jan. 31, 2023; 15 pages.
Alateah, A., "Graphene concrete: Recent advances in production methods, performance properties, environmental impact and economic viability", Case Studies in Construction Materials; vol. 19; Nov. 5, 2023; 25 pages.
Krystek, M. et al., "High-Performance Graphene-Based Cementitious Composites", Advanced Science; vol. 6; (2019); 12 pages.
Zhang, H. et al., "Polycarboxylate Superplasticizer—Modified Graphene Oxide: Dispersion and Performance Enhancement in Cement Paste", Nanomaterials; vol. 15, No. 419; Mar. 8, 2025; 16 pages.

* cited by examiner

200A

200B

400B

400C

500B

700A

700A'

700B

1300A

1300B

1400A

1400B

1500A

1500B

1600

1700

ADMIXTURES FOR CEMENT-BASED PRODUCTS

CROSS-REFERENCE TO RELATED APPLICATIONS

This Patent Application claims priority to U.S. Provisional Patent Application No. 63/850,378 entitled "LIQUID ADMIXTURE ADDITIVES FOR CEMENT AND CONCRETE COMPOSITIONS" filed on Jul. 24, 2025, which is assigned to the assignee hereof. The disclosure of the prior Application is considered part of and is incorporated by reference in this Patent Application in its entirety.

TECHNICAL FIELD

This disclosure relates generally to cement-based products, and more particularly, to admixtures for cement-based products that include a carbon-based filler including three-dimensional graphene.

DESCRIPTION OF RELATED ART

Recent developments in cement compositions are focused on increasing the compressive strength of cement-based products including concrete while reducing the weight associated with concrete. However, further improvements in cement and concrete compositions are desired.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In some implementations, a liquid admixture associated with a cement-based product may include one or more of calcium-silicate-hydrates ("C-S-H") or calcium-aluminum-silicate-hydrates ("C-A-S-H"), one or more of elemental zinc or a nitrate salt including zinc, and water, wherein the pH of the liquid admixture may be between approximately 9.5 and approximately 13.

In some implementations, the atomic ratio of zinc to calcium in the liquid admixture may be between approximately 0.1:1 and approximately 1:1. In some examples, the density corresponding to the one or more of calcium-silicate-hydrates ("C-S-H") or calcium-aluminum-silicate-hydrates ("C-A-S-H") in the liquid admixture is between approximately 1 g/L and approximately 700 g/L.

In some implementations, the mean chain length ("MCL") of the silicate chains associated with one or more of calcium-silicate-hydrates ("C-S-H") or calcium-aluminum-silicate-hydrates ("C-A-S-H") in the liquid admixture may be between approximately 2.5 and approximately 5.

In some implementations, the viscosity of the liquid admixture, at a shear rate of 100 $s^{-1}$, may be between approximately 1 centipoise (cP) and approximately 2000 cP. In some examples, one or more of the calcium-silicate-hydrates ("C-S-H") or the calcium-aluminum-silicate-hydrates ("C-A-S-H") may be disposed as nanoparticles.

In some implementations, the elemental composition of the liquid admixture may include between approximately 1 atomic percentage (at %) and approximately 2.5 at % calcium, between approximately 0.05 at % and approximately 1 at % aluminum, between approximately 1 at % and approximately 1.5 at % silicon, and between approximately 0.1 at % and approximately 1 at % zinc.

In some implementations, the liquid admixture may further include a superplasticizer. In some examples, the superplasticizer may include one or more of polycarboxylate ether, sulfonated naphthalene formaldehyde condensate, sulfonated melamine formaldehyde condensate, or acetone formaldehyde condensate. In some other examples, the amount of the superplasticizer in the liquid admixture may be between approximately 0.1 wt % and approximately 5 wt %.

In some implementations, the liquid admixture may further include a carbon-based filler including flaky graphene and nodular graphene ("3DG carbons"). In some instances, the concentration of the carbon-based filler in the liquid admixture is between approximately 10 g/liter and approximately 100 g/liter.

In some implementations, the carbon-based filler may be characterized by a Raman spectroscopy signature having an $I_D/I_G$ ratio between approximately 0.35 and approximately 0.56. In some examples, the carbon-based filler may be characterized by a Raman spectroscopy signature having an $I_{2D}/I_G$ ratio between approximately 0.53 and approximately 0.7. In some other examples, the carbon-based filler may be characterized by a Raman spectroscopy signature having an $I_D/I_G$ ratio between approximately 0.35 and approximately 0.56, and an $I_{2D}/I_G$ ratio between approximately 0.53 and approximately 0.7.

In some implementations, the flaky graphene associated with the carbon-based filler may include one or more of few layer graphene ("FLG") or many layer graphene ("MLG"). In some other instances, flaky graphene may include between approximately 5 graphene layers and approximately 15 graphene layers. In some examples, the carbon-based filler may further include graphitic carbon. In some other examples, the nodular graphene in the carbon-based filler may include a plurality of carbon nano-onions ("CNOs").

In some implementations, a method of making a cured cement-based product may include forming a base slurry by mixing one or more of a cementitious binder, fine aggregates, or coarse aggregates with water, producing a modified slurry by adding a liquid admixture including one or more of calcium-silicate-hydrates ("C-S-H") or calcium-aluminum-silicate-hydrates ("C-A-S-H") to the base slurry, and forming the cured cement-based product by curing the modified slurry.

In some implementations, the liquid admixture may further include a carbon-based filler including flaky graphene and nodular graphene ("3DG carbons"). In some instances, the concentration of the carbon-based filler in the liquid admixture may be between approximately 10 g/liter and approximately 100 g/liter. Additional details related to the 3DG carbons are described below in this disclosure. In some instances, the carbon-based filler may further include graphitic carbon.

In some implementations, the liquid admixture may further include one or more of elemental zinc or a nitrate salt including zinc, and water. In some instances, the pH of the liquid admixture may be between approximately 9.5 and approximately 13.

In some implementations, producing the modified slurry may include adding the liquid admixture at a concentration between approximately 0.05 wt % by weight of binder ("bwob") and approximately 2.5 wt % bwob. In some examples, the cementitious binder may include one or more of ordinary Portland cement ("OPC") or slag. In some other examples, the cured cement-based product may include one or more of mortar or concrete.

In some implementations, a method of forming high performance concrete ("HPC") may include providing a liquid admixture including one or more of calcium-silicate-hydrates ("C-S-H") or calcium-aluminum-silicate-hydrates ("C-A-S-H") and producing a wet mixture by mixing a cementitious binder, fine aggregates, coarse aggregates, and the liquid admixture. In some examples, a concentration of the liquid admixture may be approximately 1 wt % by weight of binder ("bwob"). In some other examples, the cementitious binder may be free of silica fume. In some examples, the cementitious binder may include one or more of ordinary Portland cement ("OPC") or slag. In some other examples, the cementitious binder may include approximately 67 wt % ordinary Portland cement, and approximately 32 wt % slag.

In some other implementations, the liquid admixture may further include one or more of elemental zinc or a nitrate salt including zinc and water. In some examples, the pH of the liquid admixture may be between approximately 9.5 and approximately 13.

In some implementations, the method may further include forming the high performance concrete by curing the wet mixture. In some examples, the cured concrete may be characterized by a compressive strength measured using ASTM C39 at a hydration period of 28 days of at least approximately 10,440 psi (70 MPa).

In some implementations, the liquid admixture may further include a carbon-based filler including flaky graphene and nodular graphene ("3DG carbons"). In some instances, the carbon-based filler may further include graphitic carbon. In some examples, the concentration of the carbon-based filler in the liquid admixture may be between approximately 10 g/liter and approximately 100 g/liter. In some other examples, the high performance concrete may be characterized by a compressive strength measured using ASTM C39 at a hydration period of 28 days of at least approximately 10,440 psi (70 MPa).

In some implementations, another liquid admixture associated with a cement-based product, may include one or more of calcium-silicate-hydrates ("C-S-H") or calcium-aluminum-silicate-hydrates ("C-A-S-H"), a carbon-based filler including flaky graphene and nodular ("3DG carbons") and water. Additional details related to the 3DG carbons are described below in this disclosure. In some instances, the carbon-based filler may further include graphitic carbon. In some examples, a concentration of the carbon-based filler in the liquid admixture may be between approximately 25 g/liter and approximately 100 g/liter. In some examples, the liquid admixture may further include one or more of elemental zinc or a nitrate salt including zinc. In some other examples, the atomic ratio of zinc to calcium in the liquid admixture may be between approximately 0.1:1 and approximately 1:1.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
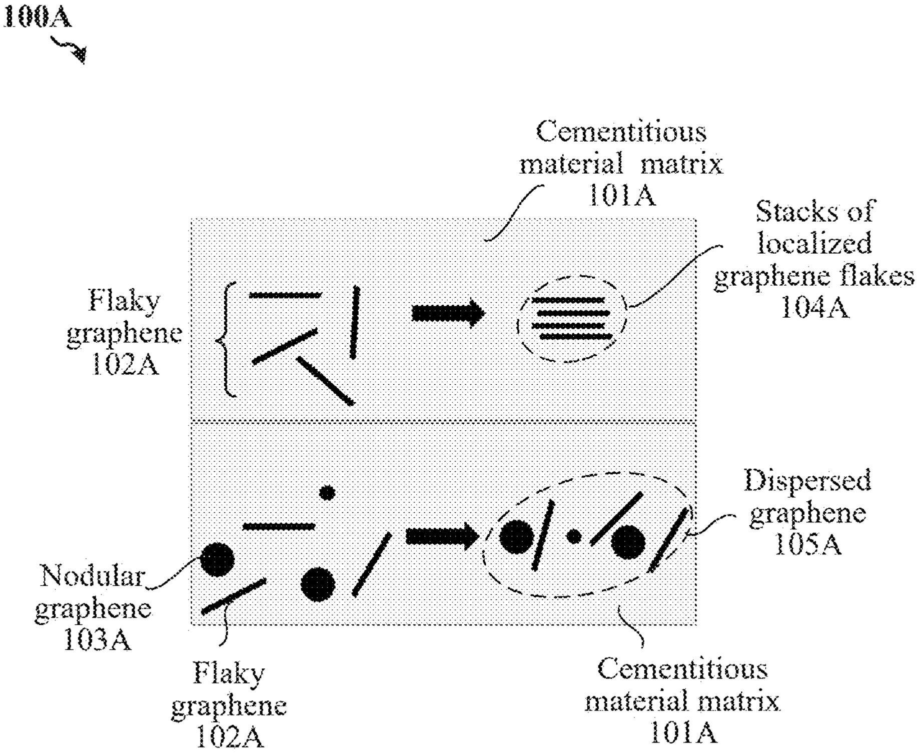
FIG. 1A shows a schematic diagram of a cementitious material matrix including 3DG carbons, according to some implementations.

The following description is directed to some example implementations for the purpose of describing the innovative aspects of this disclosure. However, a person having ordinary skill in the art will readily recognize that the teachings herein can be applied in a multitude of different ways. The described implementations can be implemented in cement compositions for a variety of applications and may be tailored to compensate for various performance related deficiencies. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

Various aspects of the novel compositions and methods are described more fully herein with reference to the accompanying drawings. These aspects are provided so that this disclosure will be thorough and complete, and will fully convey the scope of the disclosure to those skilled in the art. Although some examples and aspects are described herein, many variations and permutations of these examples fall within the scope of the disclosure. Although some benefits and advantages of the various aspects are mentioned, the scope of the disclosure is not intended to be limited to benefits, uses, or objectives. The detailed description and drawings are merely illustrative of the disclosure rather than limiting, the scope of the disclosure being defined by the appended claims and equivalents thereof.

In this disclosure, cement-based products include one or more of mortar, concrete, quick set cement products, high alumina cements, oil field cements, ready-mix concrete, precast concrete, concrete blocks, concrete paver, concrete pipe, among other similar non-limiting examples. Ready-mix concrete may account for approximately 50% to 60% of the global market for concrete products.

Additionally, cementitious materials (also referred to herein as cementitious binders) include hydraulic cements that harden in water and supplementary cementitious materials ("SCM"). An SCM may be defined as "an inorganic material that contributes to the properties of a cementitious mixture through hydraulic or pozzolanic activity, or both." See, for example, ASTM 2015, Paper FHWA-HIF-16-001, U.S. Department of Transportation. The type and amount of SCMs may be varied to reduce the amount of Portland cement in concrete (or increase the replacement levels of cement), without sacrificing mechanical strength. SCMs may contribute to the formation of cementitious materials by both hydraulic activity and pozzolanic activity. SCMs (and cements) that have hydraulic properties, harden during hydration. SCMs with pozzolanic activity require both water and C-H as reactants to form C-S-H. Examples of SCMs include fly ash, blast furnace slag (referred to herein as "slag"), silica fume, natural pozzolans, calcined clay including metakaolin, among other similar non-limiting examples.

In this disclosure, fine aggregates may include natural sand or crushed stone. The fine aggregates may be sized to pass through a ⅜ in. sieve. In some instances, the average diameter of fine aggregates may be less than approximately 9.5 mm (approximately 0.37 in.). Coarse aggregates may include one or more of gravel or crushed stone. The coarse aggregates may be characterized by an average diameter between approximately 0.375 in. and approximately 1.5 in.

In this disclosure, high performance concrete ("HPC") generally refers to concrete that is characterized by improved compressive strength and durability relative to the compressive strength and durability, respectively, of regular concrete. High performance concrete may be used in the construction of bridges, tunnels and other infrastructure that require enhanced strength, durability, enhanced resistance to salt and water migration, and reduced crack formation. In general, high-performance concrete may refer to concrete with a 28-day compressive strength of at least 70 MPa (approximately 10,400 psi).

In this disclosure, limestone calcined clay cement ("LC3"), may include a blend of limestone and calcined clay. An example of LC3 may include ASTM C195 Type IL cement (PLC, Holcim), a high purity metakaolin (MK, Omya), and limestone (LS, Omya). "Binder" includes cement and supplementary cementitious materials. An example LC3 composition may include approximately 15% limestone, approximately 5% gypsum, approximately 30% calcined clay, the remaining being clinker (as described below in this disclosure).

In this disclosure, a "carbon-based filler" includes flaky graphene and nodular graphene. Additional details are described below in this disclosure. In some instances, flaky graphene may include graphitic carbon. Graphitic carbon is generally characterized by a layered three dimensional structure including a large number of graphene layers. As such, the "carbon-based filler" may be referred to as "mixed morphology" carbons.

Mixed morphology carbons include agglomerates of primary carbon nanoparticles. A primary carbon particle may be considered as a spheroidal shaped, non-discreet component of an aggregate that is separable from the aggregate only by fracturing. A plurality of primary carbon nanoparticles may be coalesced or joined to form carbon aggregates including primary carbon nanoparticles. An aggregate may be considered as a discrete, colloidal entity that is the smallest dispersible unit composed of coalesced primary carbon nanoparticles. The primary carbon particles may be connected together by one or more of Van der Waals forces, covalent bonds, ionic bonds, metallic bonds, or by other physical or chemical interactions. Additionally, a plurality of carbon aggregates may be considered as carbon agglomerates. Since carbon aggregates of at least 1 μm in size may be considered as agglomerates, the term "carbon aggregates" also includes "carbon agglomerates" in this disclosure.

The carbon nanoparticles may include three-dimensional ("3D") mesoporous carbon nanoparticles. As such, the "mixed morphology" carbons may also be referred to herein as three dimensional ("3D") graphene or three dimensional graphene ("3DG carbons"). A mesoporous material, as generally understood and as referred to herein, includes a material containing pores with diameters between 2 nm and 50 nm, according to the International Union of Pure and Applied Chemistry ("IUPAC") nomenclature. For the purposes of comparison, IUPAC defines microporous material as a material having pores smaller than 2 nm in diameter and defines macroporous material as a material having pores larger than 50 nm in diameter.

Those skilled in the art would recognize that "graphene" generally refers to an allotrope of carbon in the form of a two-dimensional, atomic-scale, hexagonal lattice in which one atom forms each vertex. The carbon atoms in graphene may be $sp^2$ hybridized carbon atoms. Additionally, pristine graphene has a Raman spectrum with two main peaks: a G-mode at approximately 1580 $cm^{-1}$ and a D mode at approximately 1350 $cm^{-1}$ (when using a 532 nm excitation laser). In contrast, the 3DG carbons are characterized by a distinct morphological structure as described below in this disclosure.

In some implementations, the 3DG carbons may include one or more of oxygen containing surface functional groups, nano-silica particles, or nano-silica surface functional groups disposed on one or more of surfaces of the 3DG carbons or within the 3DG carbons. In some instances, the 3DG carbons may be characterized by a graphene to amorphous carbon ratio of between approximately 1% and approximately 95%. In some implementations, the 3DG carbons may be characterized by a carbon purity of at least 99.9%. The 3DG carbons may be characterized by an electrical conductivity of between approximately 500 S/m and approximately 20,000 S/m when compressed at pressure of approximately 12,000 pounds per square inch ("psi").

Concrete compositions including 3DG carbons may enable the replacement of Portland cement using supplementary cementitious materials ("SCMs"), increase the quantity of aggregates in the formulation, and may significantly reduce the production cost of concrete. Concrete including the 3DG carbons, as described herein, may also reduce the carbon footprint associated with the production of concrete and may increase the lifespan of concrete in various applications. In some implementations, a replacement level of cement in the example concrete compositions described herein may be up to 60%.

In some implementations, and without being bound by any particular theory, the 3DG carbons may function as a nano-filler, improve microscopic pore structure, and enhance the mechanical performance of cement and cement-based products including concrete. As hydration rates slow down at later ages of the curing process, 3DG carbons may serve as nucleation sites for improving hydration rates of cementitious materials. With the addition of the 3DG carbons, the chloride resistance of concrete including 3DG carbons may be improved by approximately 200% relative to the chloride resistance of equivalent or corresponding concrete not including 3DG carbons, and the resistance to water permeability may be increased by approximately 25%.

Ordinary Portland cement ("OPC") is produced by calcining limestone ($CaCO_3$) with clay (aluminosilicates) in a kiln at approximately 1500° C. to form a sintered product commonly known as clinker. Portland cement is used as a cementitious material (binder) in cement products including concrete. ASTM standard specification (ASTM C150) requires that Portland cement "must have the following chemical compositions: aluminum oxide, ferric oxide, magnesium oxide, sulfur trioxide, tricalcium silicate ("C3S"), dicalcium silicate ("C2S"), tricalcium aluminate ("C3A"), and tetracalcium aluminoferrite." When mixed with water, the calcium silicates and aluminates are hydrated via several hydration and gelation reactions to primarily form calcium-silicate-hydrate ("C-S-H") paste, which gradually bonds sand and gravel particles in concrete together and hardens to form a solid water-resistant product via a process known as setting. After initial setting, concrete continues to harden and develop its mechanical strength over a period of approximately 30 days. Approximately less than 5 wt % gypsum (hydrated calcium sulfate) may be added to clinker and ground to fine powder in a ball mill. Gypsum is added primarily to retard the setting time of cement by slowing down the hydration rates of the C2S, C3S and C3A, and more importantly, the exothermic hydration of C3A by preventing "flash setting."

In addition to forming C-S-H, hydration typically forms a byproduct known as Portlandite, which is composed of calcium hydroxide ("C-H"). Portlandite does not have cementitious properties and may cause an undesirable increase in the permeability of concrete to water, which reduces the mechanical strength of concrete. To mitigate this effect, supplementary cementitious materials ("SCM") may be added to Portland cement or concrete prior to hydration, to react with C-H and water during hydration via the pozzolanic reaction, which also has the beneficial effect of forming additional C-S-H cementitious compounds.

As previously described, undesirable C-H produced by hydraulic activity (for example, hydration of Portland cement), may be consumed during pozzolanic activity provided by SCMs to produce additional amounts of cementitious compounds like C-S-H. Examples of SCMs may include fly ash (byproduct of coal fired furnaces), blast furnace slag (referred to herein as "slag"), silica fume, and natural pozzolans like metakaolin. Other SCMs including slag may exhibit hydraulic activity and produce cementitious compounds during hydration. Slag cement does not exhibit pozzolanic activity but consumes C-H by binding alkalis in its hydration products. Therefore, although it is a hydraulic cement, slag cement provides the benefits of a pozzolan. SCMs are also used to improve concrete performance in its fresh and hardened state and also to improve the workability, durability, and strength of concrete.

The cement industry contributes to approximately 8% of global greenhouse gas ($CO_2$) emissions. Approximately 90% of these emissions are produced during the high temperature calcination process of limestone and clay materials at amounts of approximately 0.8 tons $CO_2$ per ton of OPC, which includes the amount of $CO_2$ produced by combustion of fuels used to heat the kilns. Accounting for $CO_2$ emissions from quarry-to-point-of-use, approximately 1 ton of $CO_2$ is produced per ton of OPC. Therefore, considerable research and development has been directed to reduce the amount of Portland cement in concrete and increase the replacement levels of cement. As described above, using SCM additives is one approach to increase the replacement levels of cement and realize reductions in $CO_2$ emissions.

The amount of an SCM including fly ash in concrete may vary from 5 wt % to 65 wt % by weight of binder ("bwob"). The amount of slag may vary from 20 wt % bwob to 70 wt % bwob. The amount of silica fume may vary from 5 wt % bwob to 12 wt % bwob. Natural pozzolans that exhibit pozzolanic activity may include metakaolin, calcined shale, or clay. The amount of metakaolin may vary from 5 wt % bwob to 70 wt % bwob. Higher amounts (percentage by mass) of calcined shale or clay may be used. See, for example, paper CIP30-SCMs, National Ready Mixed Concrete Association, 2000. While fly ash and slag increase initial set time and setting time of concrete, silica fume accelerates the hydration of Portland cement by providing nucleation sites for the formation of hydration products like C-S-H.

Researchers at Exeter University (United Kingdom) have reported that graphene additives to cement may increase the replacement level of cement in concrete by as much as 50% and lead to significant reduction in $CO_2$ emissions. Small amounts of graphene additives also increase mechanical strength, durability, and the water resistance of concrete. Graphene is a single layer of carbon atoms arranged in a hexagonal structure. Atomically thin shards of graphene may be suspended in water during mixing concrete. Additionally, researchers at the University of Manchester (United Kingdom) have reported that graphene not only provides mechanical strength but also acts as a catalyst surface for initiating hydration reactions, which provides a cured cement product with improved strength, durability, and corrosion resistance.

PureGraph® (First Graphene, United Kingdom) is a graphene nanoplatelet powder additives with particle size ($D_v50$) from 5 μm to 50 μm. The graphene nanoplatelets are produced by electrochemical exfoliation of graphite. The powders are not aggregated and may be dispersed in water and added to cement. Reports suggest that 0.01% to 0.05% of graphene nanoplatelet powders in cement compositions provide the same or better mechanical strength as Portland cement in cementitious products while reducing the amount of clinker by approximately 20% to 30%. That is, the replacement level of OPC is approximately 20% to 30%. As such, $CO_2$ emission reduction of approximately 20% is possible even with small amounts of graphene additives.

Reports suggest that graphene physically and chemically interacts with cementitious binders and improves adhesion between the graphene basal planes and cement gel by Van der Waals forces, which reinforces the hydrated structure by preventing cracks from developing at a nanoscale. Changes in porosity and hydration at the graphene-cement interface have also been observed. When used as a water-based admixture in typical cement-based mortar at dosing levels of less than 0.1%, graphene was found to increase compression strength by 34% increase in and tensile strength by 7%. However, graphene produced by exfoliation of graphite is an expensive boutique additive. Reports suggest that in volumes approaching approximately 5 tons, the price range of the graphene nanoplatelet powders may be approximately \$250/kg-\$300/kg, which is approximately 2000× the U.S. price of Portland cement (of approximately \$125/ton). Less expensive additives and cement compositions which offer higher replacement levels of Portland cement, and which lead to reduced setting time without degrading mechanical strength are required.

In some implementations, a cement composition may include ordinary Portland cement ("OPC"), one or more secondary cementitious material (SCM) additives, and a carbon filler including mixed morphology carbons ("3DG carbons"). As previously described herein, mixed morphology carbons include flaky graphene and nodular graphene. In some instances, the mixed morphology carbons may also include graphitic carbon. Any one of the SCMs, or combination of SCMs, described in this disclosure may be used in cement-based product formulations in accordance with various aspects of the present disclosure. The amount of mixed morphology carbons may be between approximately 0.05% by weight of binder ("bwob") and 2% bwob.

FIG. 1A shows a schematic diagram 100A of a cementitious material matrix including a carbon filler, according to some implementations. The example carbon fillers (also referred to herein as a "mixed morphology carbons") may include flaky graphene 102A and nodular graphene 103A dispersed in the cementitious material matrix 101A. As previously described herein, due to its complex mixed morphology, the example carbon filler including flaky graphene and nodular graphene may also be referred to as three-dimensional graphene carbons ("3DG carbons").

In cement formulations that include SCMs including metakaolin, the 3DG carbons may nucleate, seed, and accelerate C-S-H growth through the pozzolanic reaction of the silicates in metakaolin with calcium hydroxide in the cement. Regulated gelation and formation of 'entangled' fiber macromolecules from dispersed 3DG carbon fillers may produce a high-strength geopolymer binder matrix. A geopolymer is generally an aluminosilicate inorganic polymer characterized by a covalently bonded, amorphous, or semi-crystalline matrix or network.

An example of nodular graphene may include carbon nano-onions (CNOs). As shown in FIG. 1A, a carbon filler including only flaky graphene 102A may not disperse in the cementitious material matrix 101A and instead localize or agglomerate as undesirable stacks of localized graphene flakes 104A in the cementitious material matrix 101A. In contrast, an example carbon filler including both flaky graphene 102A and nodular graphene 103A may be uniformly dispersed, or substantially uniformly dispersed, in the cementitious material matrix 101A as dispersed graphene 105A without forming localized islands or stacks of graphene.

Without being bound by any particular theory, flaky graphene may be characterized by $sp^2$-hybridized carbon atoms and are prone to stack via π-π bond interactions. Stacked or localized graphene flakes 104A may hinder uniform dispersion of the carbon filler in the cementitious material matrix 101A. Additionally, a carbon filler including only nodular graphene 103A may not be effective in reinforcing the cementitious material matrix, because nodular graphene 103A is generally spherical, or substantially spherical in shape, and is characterized by a lower surface area-to-volume ratio than flaky graphene 102A.

In contrast, 3DG carbons including both flaky graphene 102A and nodular graphene 103A inhibits stacking and localization of flaky graphene 102A as flaky graphene 102A may be interleaved with nodular graphene 103A resulting in dispersed graphene 105A. 3DG carbons including flaky graphene 102A and nodular graphene 103A may also increase compressive strength, material reinforcement, and thermal conductivity of the cementitious material mas matrix 101A and may reduce residual stresses generated during the hydration and setting of the cementitious material 101A.

In some implementations, flaky graphene may be covalently linked or welded or fused to nodular graphene by one or more of microwave radiation, direct current discharge, low temperature non-equilibrium plasma, thermal equilibrium plasma, plasma generated at an intermediate temperature below thermal equilibrium temperature during chemical processing of hydrocarbon feedstock to produce 3DG carbons.

Figures 1B, 1C:
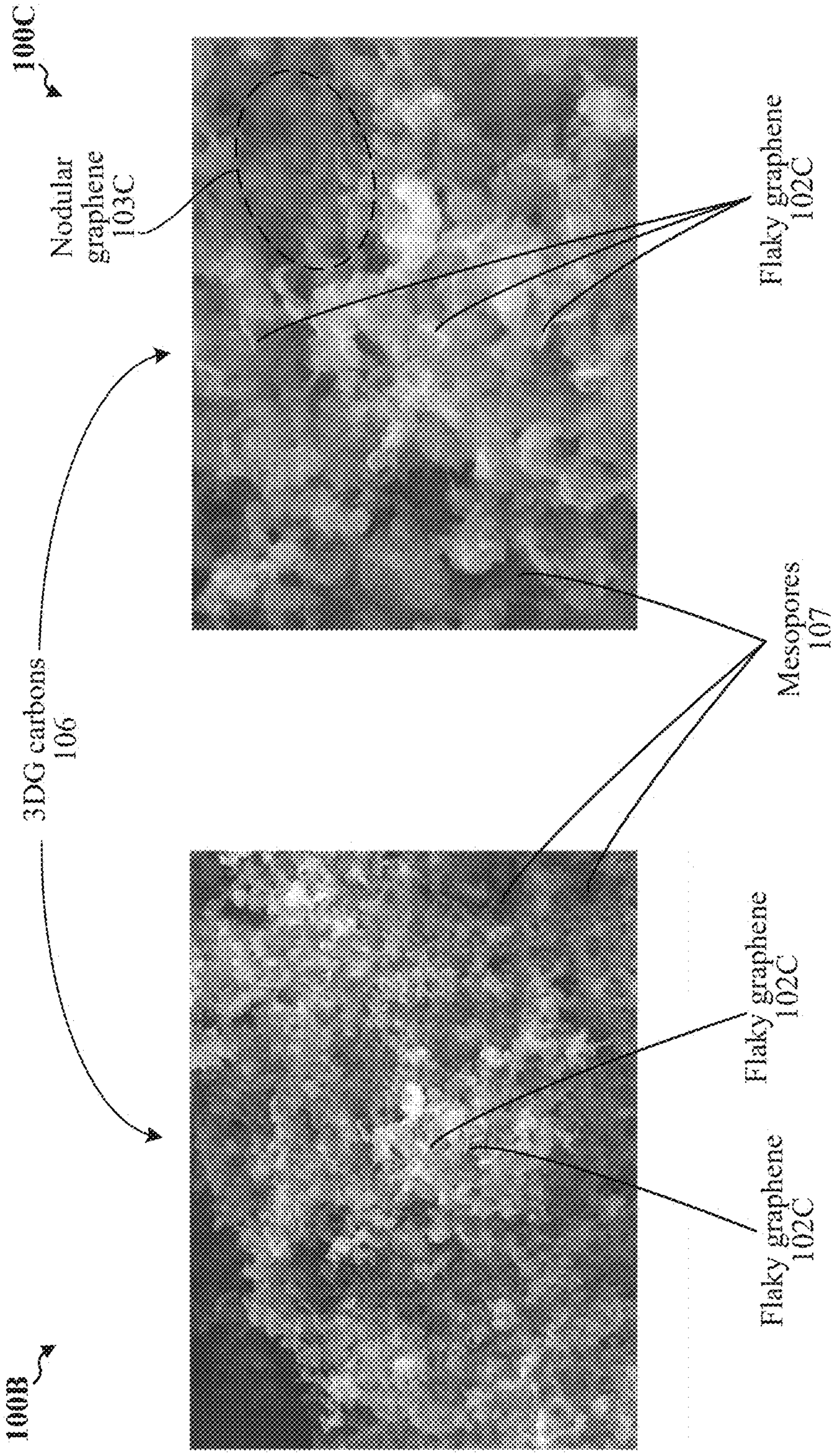
FIGS. 1B-1C show scanning electron microscopy (SEM) micrographs of three-dimensional graphene carbons (3DG carbons) including flaky graphene and nodular graphene, according to some implementations.

FIGS. 1B-1C show scanning electron microscopy ("SEM") micrographs 100B-100C of 3DG carbons including flaky graphene and nodular graphene, according to some implementations. Those skilled in the art will appreciate that the micrographs included in this disclosure are shown by way of example only, and that other scales may exist without departing from the scope and spirit of the present implementations. As can be seen, the example 3DG carbons 106 includes a plurality of flaky graphene 102C, nodular graphene 103C, and mesopores 107. Flaky graphene 102C may include one or more graphene layers as described below with reference to FIG. 3A in this disclosure.

Figure 1D:
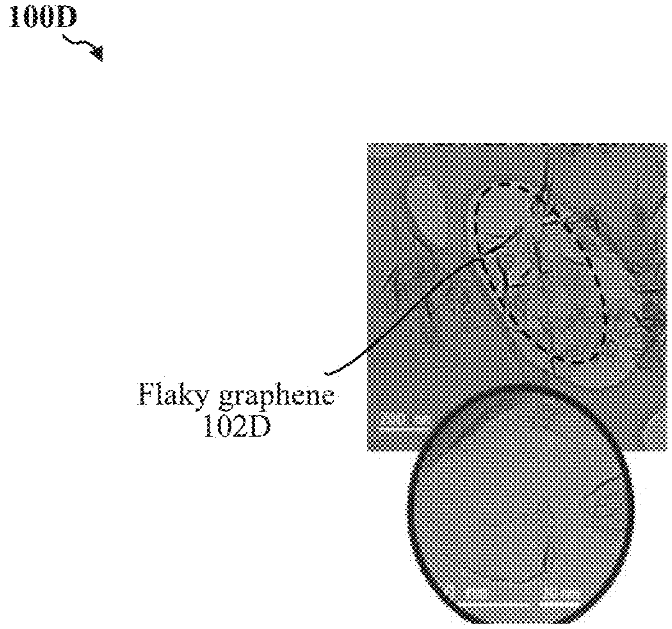
FIGS. 1D-1G show transmission electron microscopy (TEM) micrographs of 3DG carbons including flaky graphene and nodular graphene, according to some implementations.
Figure 1E:
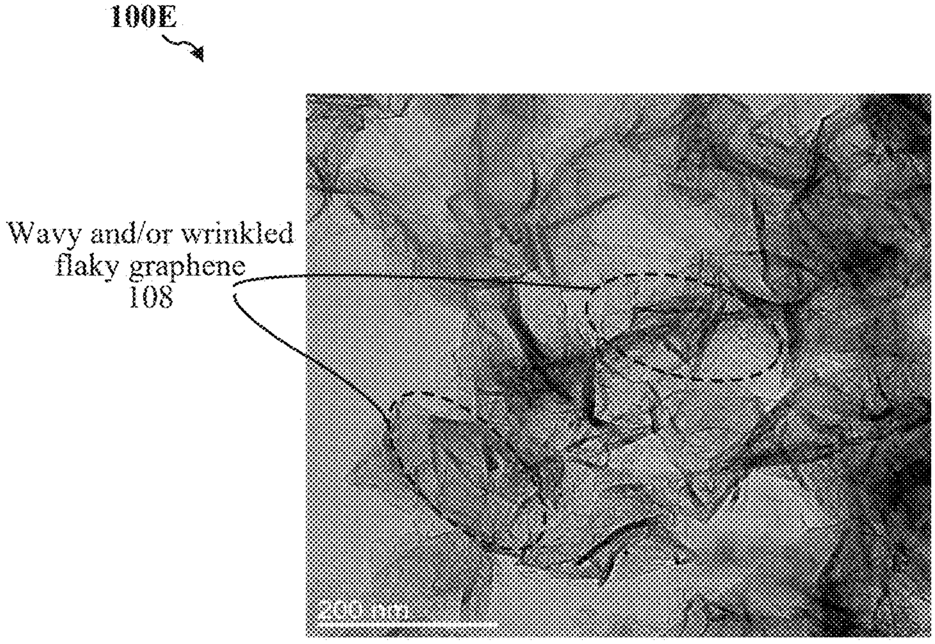
Figure 1F:
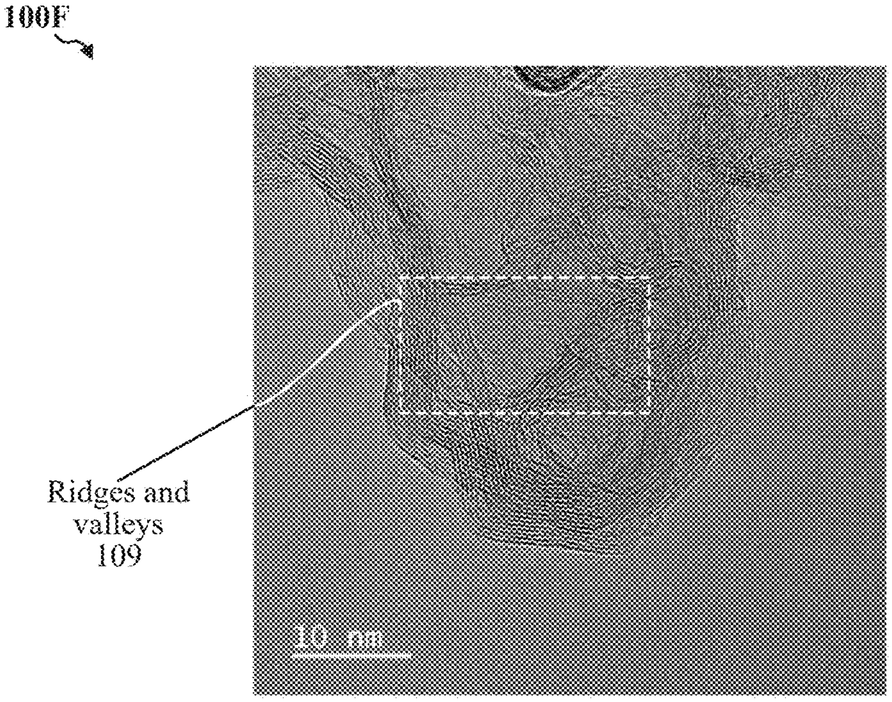

FIGS. 1D-1G show transmission electron microscopy ("TEM") micrographs 100D-100G of 3DG carbons including flaky graphene and nodular graphene, according to some implementations. In some implementations, at least some of the flaky graphene 102D may be characterized by a linear dimension of between approximately 50 nm and 200 nm. Referring to FIGS. 1D-1E, in some instances, flaky graphene 102D may include wavy or wrinkled graphene 108. Referring to FIG. 1F, in some other instances, at least some of the wavy and/or wrinkled flaky graphene may be joined together to define one or more ridges and valleys 109. At least some of the ridges and valleys 109 may produce areas of increased flexibility within the wavy and/or wrinkled graphene 108. In some implementations, flaky graphene 102D may include wavy or flexible graphene layers that resemble crinkled paper. The graphene layers may be flexible as they may be fused with each other at $sp^3$ type defects in a $sp^2$ graphene lattice structure.

Figure 1G:
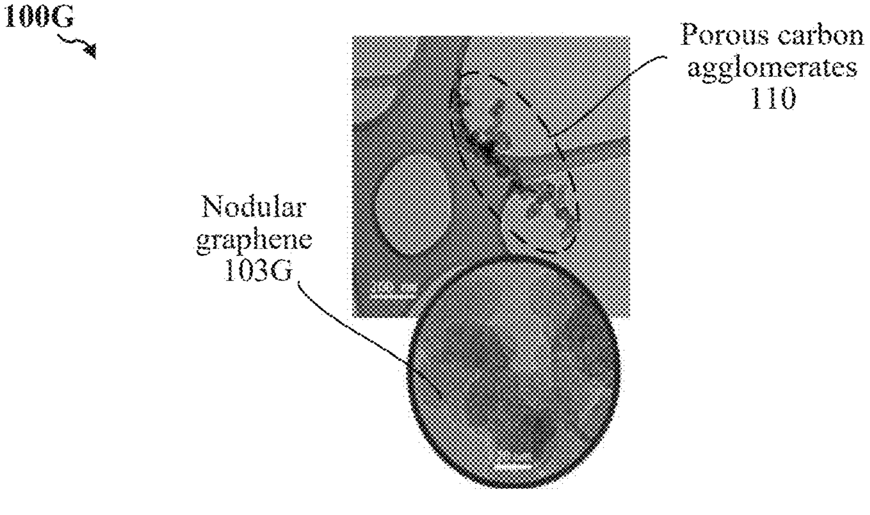

In some instances, as shown in FIG. 1G, nodular graphene 103G may be disposed as porous carbon agglomerates 110, which may be arranged as a "string of pearls." Additional details related to nodular graphene are described below with reference to FIGS. 4A-4C, 5A-5B and 6.

Figure 2A:
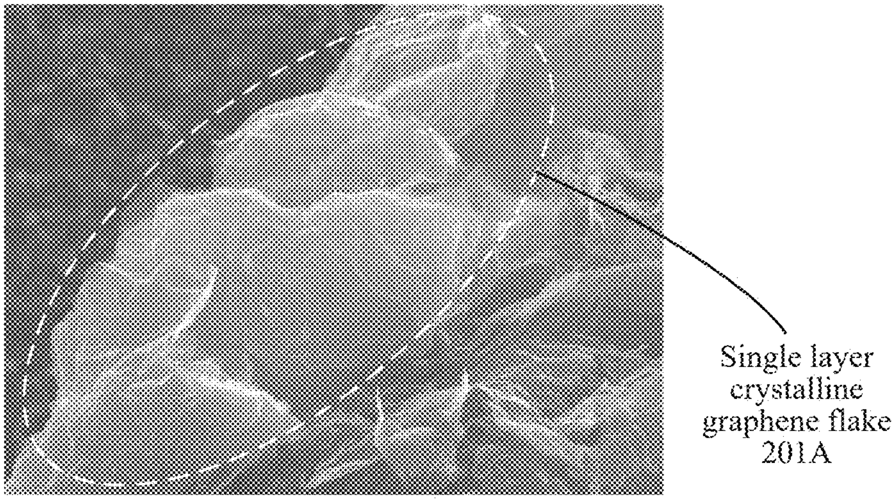
FIG. 2A shows a SEM micrograph of single layer graphene flakes.

Referring to FIGS. 1B-1C, 3DG carbons 106 including flaky graphene and nodular graphene may be characterized by a morphology that is significantly different from the morphology of each of single layer graphene or two-dimensional ("2D") graphene. FIG. 2A shows a scanning electron microscopy ("SEM") micrograph 200A of single layer graphene flakes. Single layer graphene powder supplied by ACS Material LLC (Pasadena, CA) is produced as graphene flakes using a combination of thermal exfoliation reduction and hydrogen reduction. The thickness of the single layer graphene flakes 201A is between 0.6 nm and 1.2 nm and is characterized by a BET surface area of between 400 $m^2/g$ to 1000 $m^2/g$. The flake size is between 0.4 μm and 0.5 μm. Referring to FIG. 2A and FIGS. 1B-1C, the fairly crystalline single layer graphene flakes do not include the mesoporous structure of the 3DG carbons 106 including flaky graphene and nodular graphene.

Figure 2B:
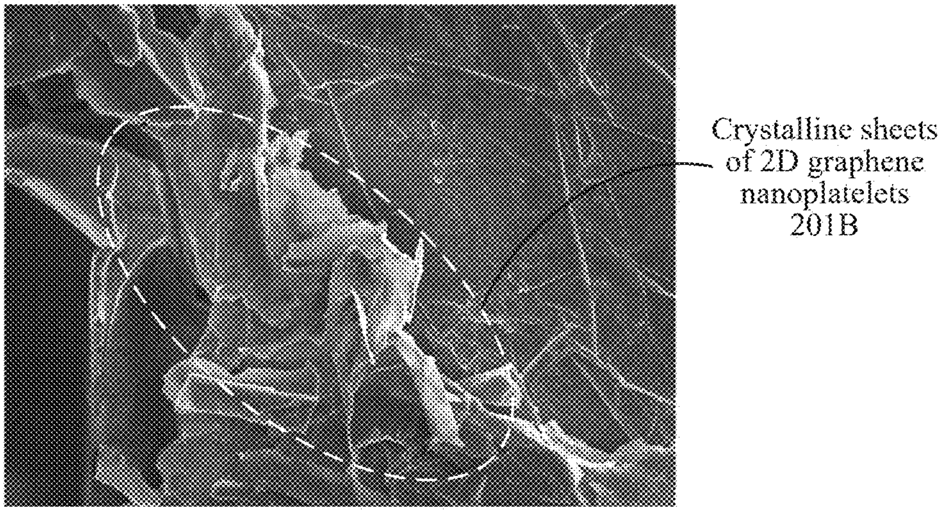
FIG. 2B shows a SEM micrograph of 2-dimensional graphene nanoplatelets.

FIG. 2B shows a SEM micrograph 200B of 2-dimensional graphene nanoplatelets. The 2-dimensional nanoplatelets supplied by XG Sciences (Lansing, MI) are produced from graphite as the starting material. The nanoplatelets or graphene flakes include nanoparticles consisting of short stacks of graphene sheets. The nanoplatelets have an average thickness of approximately 7 nm and a surface area of 120 $m^2/g$ to 150 $m^2/g$. Average particle size is between 5 μm and 25 μm. Referring to FIG. 2B and FIGS. 1B-1C, the fairly crystalline sheets of graphene nanoplatelets 201B do not include the mesoporous structure of the 3DG carbons 106 including flaky graphene and nodular graphene.

In some implementations, the amount of 3DG carbons 106 including flaky graphene and nodular graphene in a cement-based product may be between approximately 0.1 wt % by weight of binder ("bwob") and approximately 5 wt % bwob.

In some implementations, a Brunauer-Emmett-Teller ("BET") surface area measured using nitrogen gas of 3DG carbons including flaky graphene and nodular graphene may be between approximately 50 $m^2/g$ and approximately 300 $m^2/g$.

In some implementations, the 3DG carbons including flaky graphene and nodular graphene may be characterized by a Raman spectroscopy signature having an $I_D/I_G$ ratio between approximately 0.35 and approximately 0.56. In some instances, the 3DG carbons may be characterized by a Raman spectroscopy signature having an $I_{2D}/I_G$ ratio between approximately 0.53 and approximately 0.7. An $I_{2D}/I_G$ ratio less than 2 suggests that flaky graphene associated with the carbon filler includes several layers of graphene. In some other instances, 3DG carbons may be characterized by a Raman spectroscopy signature having an $I_D/I_G$ ratio between approximately 0.35 and approximately 0.56 and an $I_{2D}/I_G$ ratio between approximately 0.53 and approximately 0.7.

In some implementations, the flaky graphene associated with the 3DG carbons may include a plurality of graphene layers. In some instances, the number of graphene layers in the plurality of graphene layers may be between 5 and 15. In some other instances, the plurality of graphene layers may include one or more of few layer graphene ("FLG") or many layer graphene ("MLG"). Referring to FIGS. 1D-1F, in some implementations, flaky graphene 102A may include a plurality of graphene layers, which may be arranged as one or more stacks of graphene layers connected to each other and defining a 3D porous scaffold structure including mesopores.

As previously described herein, graphene layers in flaky graphene may be flexible as they may be fused with each other at $sp^3$ type defects in a $sp^2$ graphene lattice structure. In some implementations, 3DG carbons 106 including flaky graphene and nodular graphene (referring to FIGS. 1B-1C) may be produced using a high throughput, low-cost, cracking of a hydrocarbon gas such as natural gas, in an atmospheric microwave plasma reactor, as described below in this disclosure.

Figure 3A:
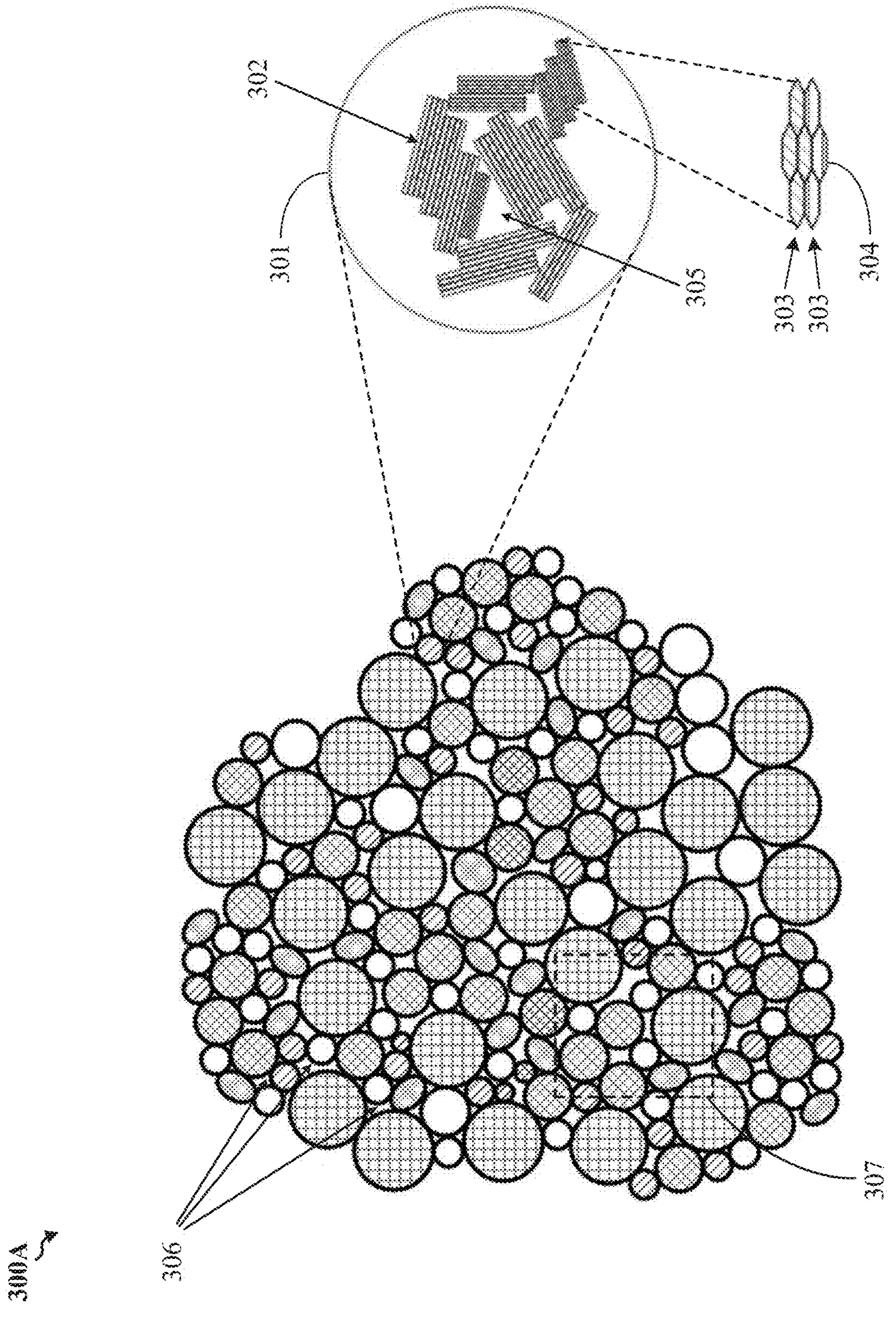
FIG. 3A shows a schematic diagram of flaky graphene in 3DG carbons, according to some implementations.

FIG. 3A shows a schematic diagram 300A of flaky graphene in 3DG carbons, according to some implementations. Flaky graphene nanoparticles may include an interconnected bundle 301 of electrically conductive graphene layers 303 arranged to form a three dimensional ("3D") open porous scaffold structure (not shown for simplicity). Each interconnected bundle 301 may include one or more stacks 302 of graphene layers. Each stack 302 may include a plurality of graphene layers 303 that are generally stacked horizontally as clearly shown in stack 304. One or more stacks 302 of graphene layers 303 may be arranged to form a 3D porous scaffold structure including mesopores 305. In some implementations, one or more of the stacks 303 may be connected substantially orthogonal to each other. In some implementations, each graphene layer 303 may be characterized by a diameter or linear dimension ("La") of between approximately 50 nm to approximately 200 nm. In some implementations, graphene stack 302 may include few layer graphene ("FLG"), which may be composed of 5 to 15 layers of graphene.

The 3DG carbons including agglomerates of nanoparticle may be produced by high throughput, low-cost, cracking of a hydrocarbon gas (including natural gas) in an atmospheric microwave plasma reactor. An example microwave plasma reactor that can be used to produce the 3DG carbons is disclosed in commonly-owned U.S. Pat. No. 9,767,992, which is incorporated by reference herein in its entirety. In some instances, plasma-based processing conditions applied or performed in a reactor including a microwave reactor may be adjusted with a high degree of tunability to achieve 3DG carbons and graphene-on-graphene densification to yield the complex 3DG carbons described herein. The 3DG carbons may be surface etched using methods including $CO_2$ etching to create pores on the external surface of the agglomerates and to increase the surface area of the 3DG carbons.

In some implementations, the flaky graphene nanoparticles associated with 3DG carbons may include three-dimensional ("3D") multi-modal mesoporous carbon nanoparticles. As previously described herein, a mesoporous material, as generally understood and as referred to herein, includes a material containing pores with diameters between 2 nm and 50 nm, according to IUPAC nomenclature. In some instances, mesoporous carbon nanoparticle may be characterized by a three-dimensional ("3D") hierarchical porous structure including pores 306. In some other instances, at least a portion of the hierarchical porous structure may further define a 3D open porous scaffold structure 307.

In some implementations, flaky graphene associated with 3DG carbons may include a plurality of interconnected crinkled 3D graphene sheets, flat graphene, wrinkled graphene, wavy or flexible graphene layers that resemble crinkled paper and may be produced using microwave processes. The graphene layers may be flexible as they may be fused with each other at $sp^3$ type defects in the $sp^2$ graphene lattice structure.

In some implementations, dopants including one or more of sulfates, silicates, or alkalis that beneficially impact cement hydration processes may be disposed on the surface of 3DG carbons described with reference to FIG. 3A, may be micro-confined in the pores of the open porous scaffold structure 307, or may be nano-confined in the open porous scaffold structure 307.

Figure 3B:
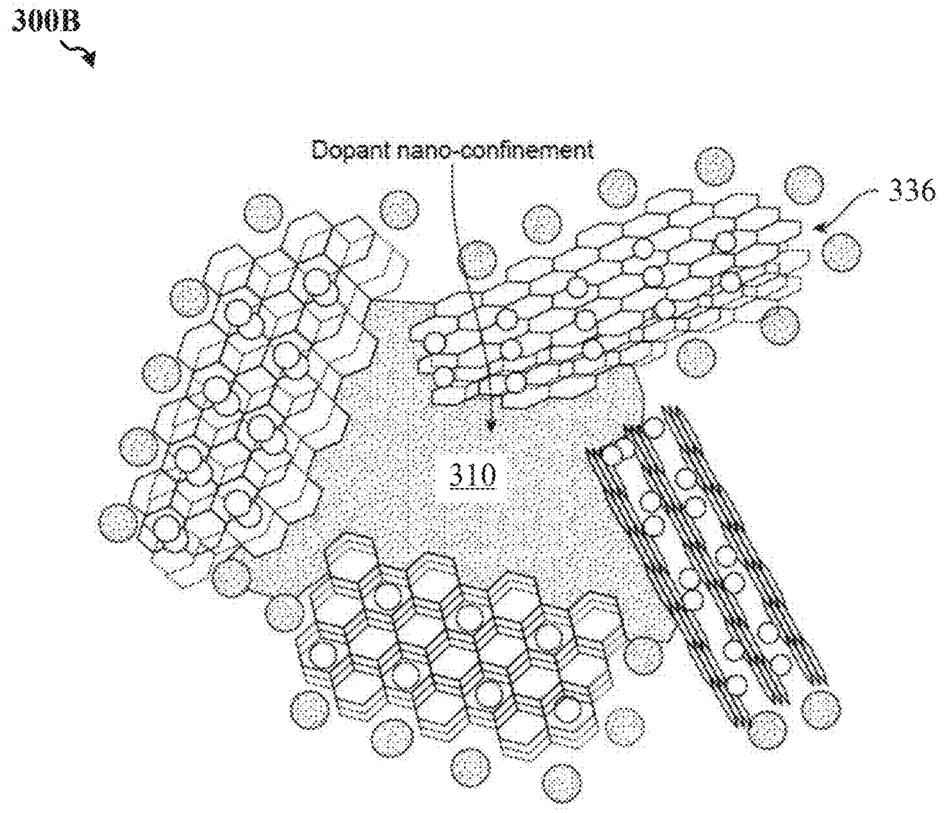
FIG. 3B shows a diagram depicting nano-confinement of a dopant in the 3DG carbons, according to some implementations.

FIG. 3B shows a diagram 300B depicting nano-confinement of a dopant in 3DG carbons, according to some implementations. In some instances, the dopants may be nano-confined in the 3D open porous scaffold structure 307 and released out as a function of time. Timed-release of nucleating agents may be tuned to impact the acceleration of the pozzolan reaction after the formation of Portlandite from the reaction of anhydrous calcium silicate with water. The 3DG carbons as described herein may also provide a flexible scaffold-type structure to manage material expansion and mitigate crack formation during hydration and curing of cement. In some configurations, the stack 302 may include one or more of single layer graphene ("SLG"), few layer graphene ("FLG") defined as ranging from 5 to 15 layers of graphene, or many layer graphene ("MLG").

Figure 3C:
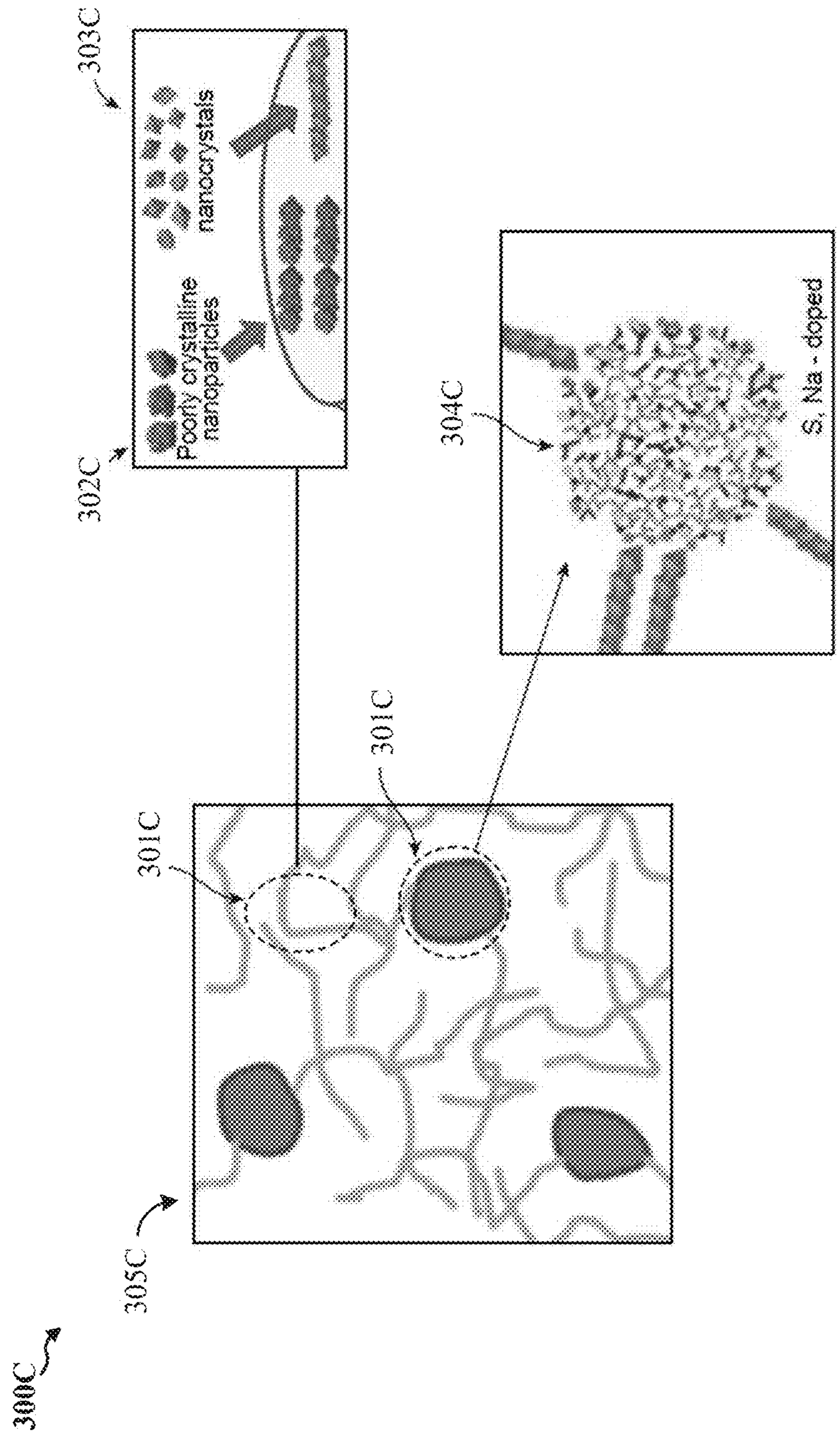
FIG. 3C shows a diagram of calcium-aluminosilicate hydrates including polymerized fibrous materials supported by 3DG carbons, according to some implementations.

FIG. 3C shows a diagram 300C of calcium-aluminosilicate hydrates 305C including polymerized fibrous materials supported by 3DG carbons, according to some implementations. Without being bound by any particular theory, hydration of ordinary Portland cement ("OPC") including gypsum (calcium sulfate dihydrate) may form random needle-like ettringite (calcium sulfo-aluminate), tobermorite (calcium silicate hydrate) and calcium-aluminosilicate hydrates ("C-A-S-H") in the form of entangled and branched polymerized fibrous material 301C of silicates and aluminates. Polymerized fibrous material 301C may include polymerized amorphous alumino-silicates 302C and crystalline alumino-silicates 303C. 3DG carbons 304C may be used as fillers or seeding agents to anchor or serve as a "bridging agent" between polymerized C-A-S-H fibers, thereby leading to in higher compressive and tensile strength and greater resistance to fracture during the setting of the hydrated cementitious product. The high surface area of 3DG carbons 304C may provide a high density of nucleating sites for C-S-H or C-A-S-H, which may then grow and polymerize to form fibrous material 301C.

By kinetically controlling the hydration and authigenic formation of entangled, needle-like crystalline phases in the cementitious matrix, elasticity and toughness may be improved over conventional concrete. 3DG carbons 304C used in example cement compositions may further reduce the permeability of the hydrated cementitious product over and above the reduction in permeability possible with the use of only a pozzolan as SCM. 3DG carbons 304C when used as additives or fillers may also reduce shrinkage on cooling the cementitious product because 3DG carbons exhibit negative thermal expansion. That is, the 3DG carbons 304C increase in size when cooling and decrease in size when heating. In contrast, cementitious products without any 3DG carbons 304C are characterized by positive thermal expansion. Therefore, by varying the amount of 3DG carbons 304C used as fillers or additives, crack formation in the cementitious product due to repetitive ambient temperature thermal cycling may be reduced.

In some implementations, and referring to FIG. 1G, nodular graphene 103G may include porous carbon agglomerates 110 of porous primary carbon nanoparticles. In some instances, the example porous primary carbon nanoparticles may resemble carbon nano-onions ("CNOs"). As described below with reference to FIG. 4A, the porous primary carbon nanoparticles may each include an inner porous shell disposed about a center of the respective porous carbon primary nanoparticle and enclosing an inner porous carbon region, an outer porous shell enclosing an outer porous carbon region disposed between the inner porous shell and the outer porous shell, and an interconnected porous network disposed in and in fluid communication with the inner and outer porous carbon regions. In some implementations, the inner porous carbon region and the outer porous carbon region may be characterized by an average pore size and an average pore density associated with each region. In some implementations, the average pore size may decrease along a radial direction from the center to the outer porous shell. In some other implementations, the porous primary carbon nanoparticles may further include one or more intermediate porous shells disposed between the inner porous shell and the outer porous shell, wherein each of the intermediate porous shells encloses a respective intermediate porous carbon region.

Figure 4A:
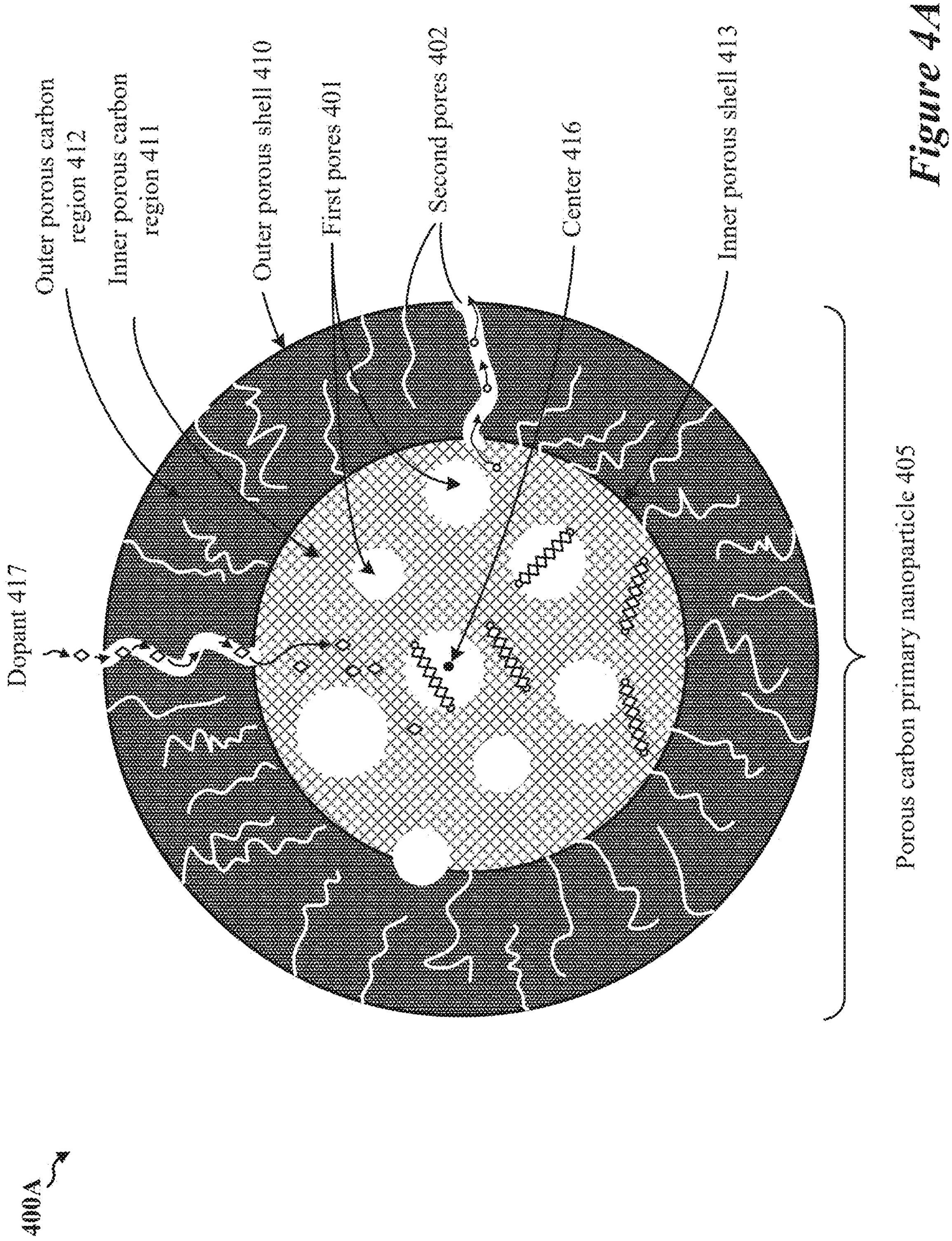
FIG. 4A shows a diagram of a porous primary carbon nanoparticle in nodular graphene associated with 3DG carbons, according to some implementations.

FIG. 4A shows a schematic diagram 400A of a porous primary carbon nanoparticle 405 in nodular graphene associated with 3DG carbons, according to some implementations. As shown in the example of FIG. 4A, the primary carbon nanoparticle 405 may include a core (inner) porous carbon region 411 defined by a first porosity and enclosed within an inner porous shell 413. The inner porous carbon region 411, which may also be referred to herein as the first porosity region, may include a plurality of first pores 401 dispersed therein. An outer porous carbon region 412, which may also be referred to herein as the second porosity region, may be disposed between the inner porous shell 413 and an outer porous shell 410 and may include a plurality of second pores 402 dispersed therein. The inner porous carbon region 411 and the outer porous carbon region 412 may be interconnected by one or more of the first pores 401 or one or more of the second pores 402, thereby interconnecting the first and second porosity regions. That is, the inner porous carbon region 411 may be configured to be in fluid communication with the outer porous carbon region 412 through an interconnected porous network. The inner porous carbon region 411 may be defined by a first pore density, and the outer porous carbon region 412 may be defined by a second pore density that is similar to or different than the first pore density. The first pores 401 may confine dopants 417 to be released as a function of time (time release) during hydration of cement, and the second pores 402 may provide pathways or channels for transport of dopants 417 into and from the primary particle 405 (and for pre-loading dopants into the primary carbon particle 405).

In some implementations, example porous primary carbon nanoparticle 405 may be characterized by an average size or principal dimension (diameter, length, width) of less than approximately 200 nm. In some implementations, an average pore size may decrease along a radial direction from the center 416 of the nanoparticle 405 to the outer boundary 413 of the nanoparticle 805. In some implementations, porous primary carbon nanoparticle 405 may be characterized by a range of pore sizes and pore distributions in each region.

Figure 4B:
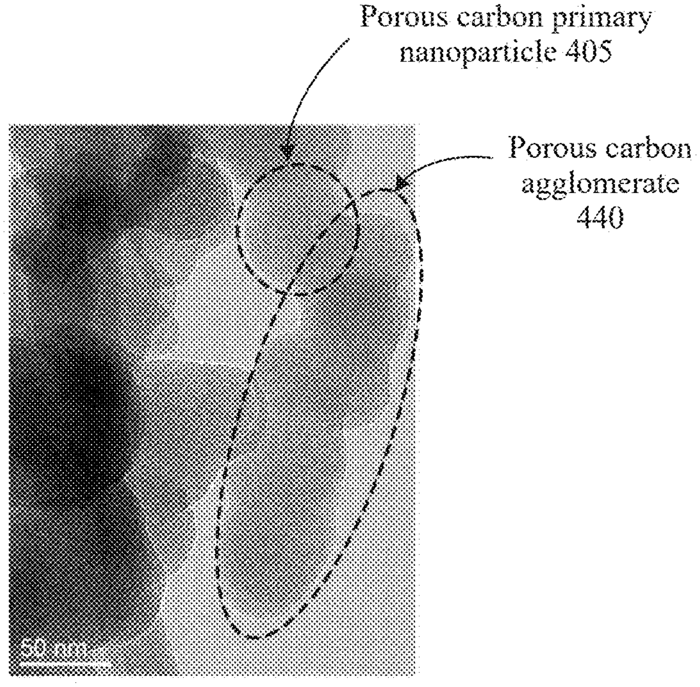
FIG. 4B shows a TEM micrograph of nodular graphene including porous carbon agglomerates of porous primary carbon nanoparticles, according to some implementations.

FIG. 4B shows a transmission electron microscopy ("TEM") micrograph 400B of nodular graphene including porous carbon agglomerates 440 of porous primary nanoparticles 405, according to some implementations. Example porous carbon agglomerate 440 may include an interconnected porous network disposed between adjacent carbon nanoparticles 405. Agglomerate 440 may include a plurality of porous carbon primary nanoparticles 405 and in some instances, may resemble a "string-of-pearls." In some implementations, the size or principal dimension of agglomerate 440 may be between approximately 50 nm and 500 nm.

Figure 4C:
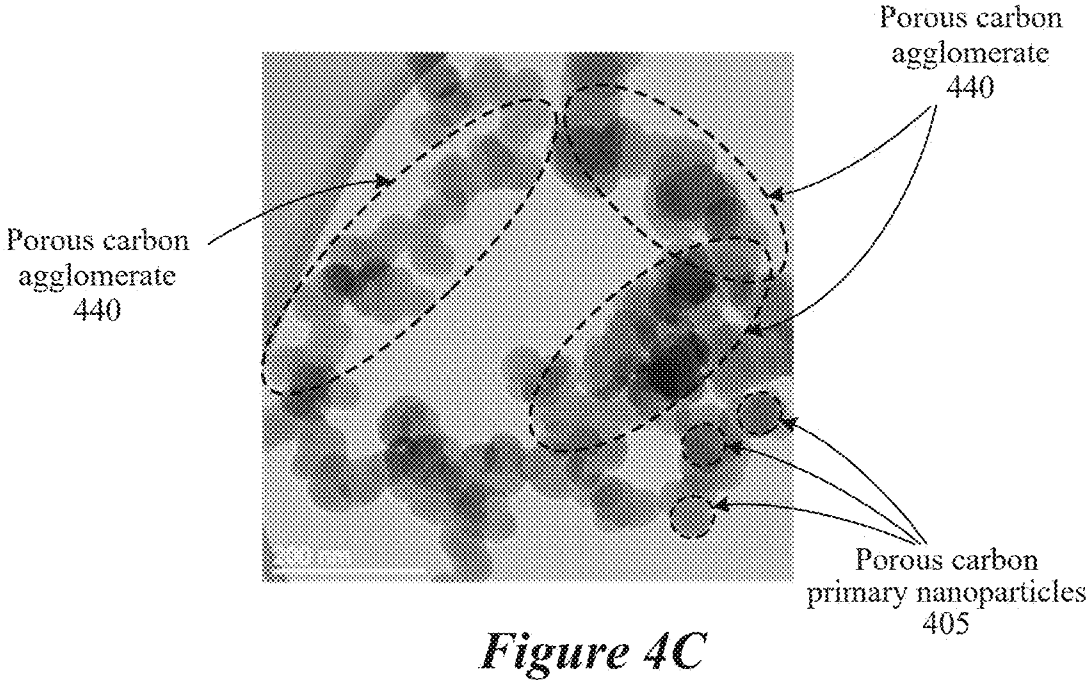
FIG. 4C shows another TEM micrograph of nodular graphene including agglomerates of porous primary carbon nanoparticles, according to some implementations.

FIG. 4C shows another TEM micrograph 400C of nodular graphene including agglomerates of porous primary carbon nanoparticles, according to some implementations. In some implementations, an example porous carbon agglomerates 440 may be spherical in shape. In some implementations, an agglomerate 440 may be of any shape, including one or more of spherical, spheroidal, dumbbell, cylindrical, elongated cylindrical type, rectangular prism, disk, wire, or may be of irregular shape.

Figure 5A:
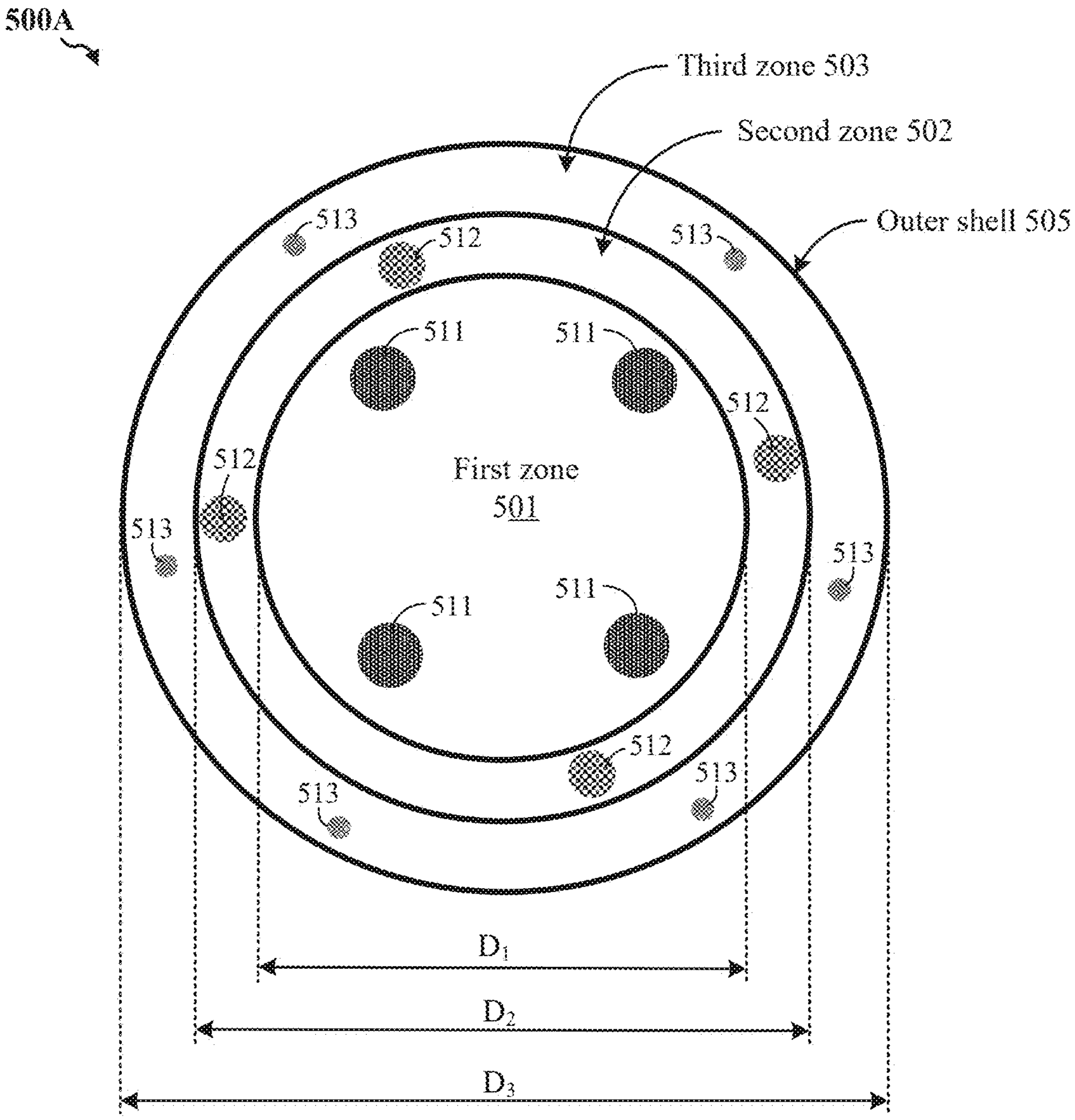
FIG. 5A shows a schematic diagram of another porous primary carbon nanoparticle in nodular graphene, according to some implementations.

In some implementations, nodular graphene in 3DG carbons may include tri-zone porous carbon primary nanoparticles. FIG. 5A shows a schematic diagram of another porous carbon primary nanoparticle 500A including nodular graphene, according to some implementations. The tri-zone particle 500A may include three discrete zones such as, but not limited to, a first zone 501, a second zone 502, and a third zone 503. In some respects, each of the zones 501-503 surrounds and/or encapsulates a preceding zone. For example, the first zone 501 may be surrounded by or encapsulated by the second zone 502, and the second zone 502 may be surrounded by or encapsulated by the third zone 503. The first zone 501 may correspond to an inner region of the tri-zone particle 500A, the second zone 502 may correspond to an intermediate transition region of the tri-zone particle 500A, and the third zone 503 may correspond to an outer region of the tri-zone particle 500A. In some respects, the tri-zone particle 500A may include a permeable shell 505 that deforms in response to contact with one or more adjacent non-tri-zone particles and/or tri-zone particles 500A.

In some implementations, the first zone 501 may have a relatively low density, a relatively low electrical conductivity, and a relatively high porosity, the second zone 502 may have an intermediate density, an intermediate electrical conductivity, and an intermediate porosity, and the third zone 503 may have a relatively high density, a relatively high electrical conductivity, and a relatively low porosity. In some respects, the first zone 501 may have a density of carbon material between approximately 1.5 g/cc and 5.0 g/cc, the second zone 502 may have a density of carbon material between approximately 0.5 g/cc and 3.0 g/cc, and the third zone 503 may have a density of carbon material of less than approximately 1.5 g/cc. In other aspects, the first zone 501 may include pores having a width of less than approximately 40 nm, the second zone 502 may include pores having a width of less than approximately 35 nm, and the third zone 503 may include pores having a width of less than approximately 30 nm.

In some implementations, the first zone 501 may have a principal dimension $D_1$ of less than approximately 100 nm, the second zone 502 may have a principal dimension $D_2$ between approximately 20 nm and 150 nm, and the third zone 503 may have a principal dimension $D_3$ of approximately 200 nm.

In some implementations, the pores associated with tri-zone particle 500A may decrease in size and volume from one zone to the other. In some implementations, the tri-zone particle may consist entirely of one zone with a range of pore sizes and pores distributions (e.g., pore density). For the example of FIG. 5A, the pores 511 associated with the first zone 501 or the first porosity region may have relatively large widths and may be defined as macropores, the pores 512 associated with the second zone 502 or the second porosity region have intermediate-sized widths and may be defined as mesopores, and the pores 513 associated with the third zone 503 or the third porosity region have relatively small widths and may be defined as micropores.

As previously described with reference to FIG. 4B-4C, a group of tri-zone porous carbon primary nanoparticles 500A may be joined together to form an agglomerate 440. In some implementations, a plurality of mesopores may be interspersed throughout the agglomerates formed by respective groups of the carbon nanoparticles. In some instances, the first porosity region (also referred to as first zone) 501 may be at least partially encapsulated by the second porosity region (also referred to as second zone) 502 such that a respective agglomerate may include one or more mesopores and one or more macropores. In one implementation, a mesopore may have a principal dimension between approximately 3.3 nanometers (nm) and approximately 19 nm, and a macropore may have a principal dimension between approximately 0.1 μm and approximately 1,000 μm. In some instances, the tri-zone particle 500A may include carbon fragments intertwined with each other and separated from one another by at least some of the mesopores.

Figure 5B:
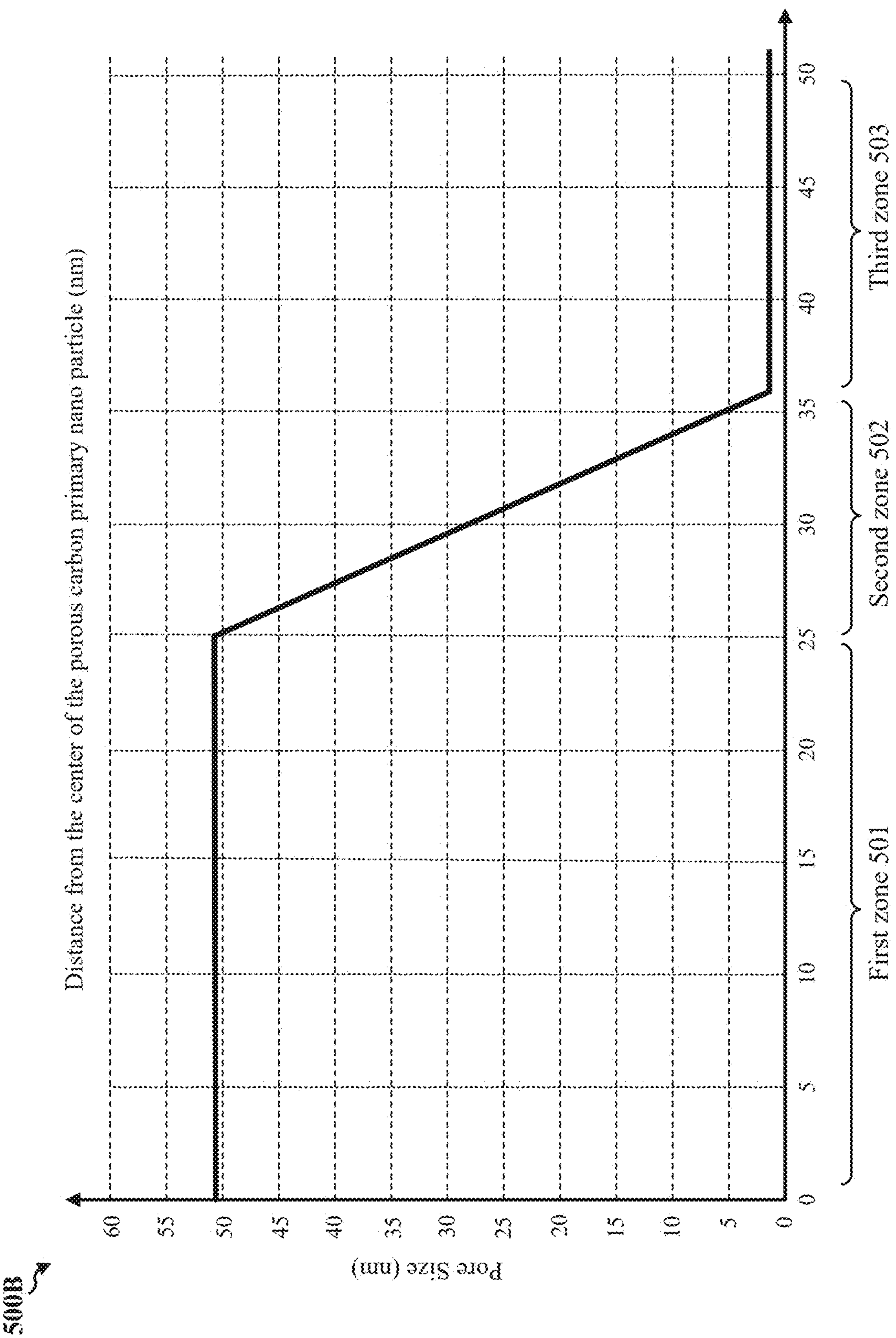
FIG. 5B shows a step function associated with pore size distribution representative of a porous carbon primary nanoparticle of FIG. 5A, according to some implementations.

FIG. 5B shows a step function 500B associated with the pore size distribution representative of a porous carbon primary nanoparticle of FIG. 5A, according to some implementations. As previously discussed, the pores distributed throughout the tri-zone particle 500A may have different sizes, volumes, or distributions. In some implementations, the average pore volume may decrease based on a distance between a center of the tri-zone particle 500A and an adjacent zone, for example, such that pores associated with the first zone 501 or the first porosity region have a relatively large volume or pore size, pores associated with the second zone 502 or the second porosity region have an intermediate volume, and pores associated with the third zone 503 or the third porosity region have a relatively small volume. The interior region has a higher pore volume than the regions near the periphery. In the example of FIG. 5A, the average pore volume in the inner region (also referred to as first zone) is approximately 3 cc/g, the average pore volume in the outermost region (also referred to as third zone) is approximately 0.5 cc/g and the average pore volume in the intermediate region (also referred to as second zone) is between approximately 0.5 cc/and approximately 3 cc/g.

Figure 6:
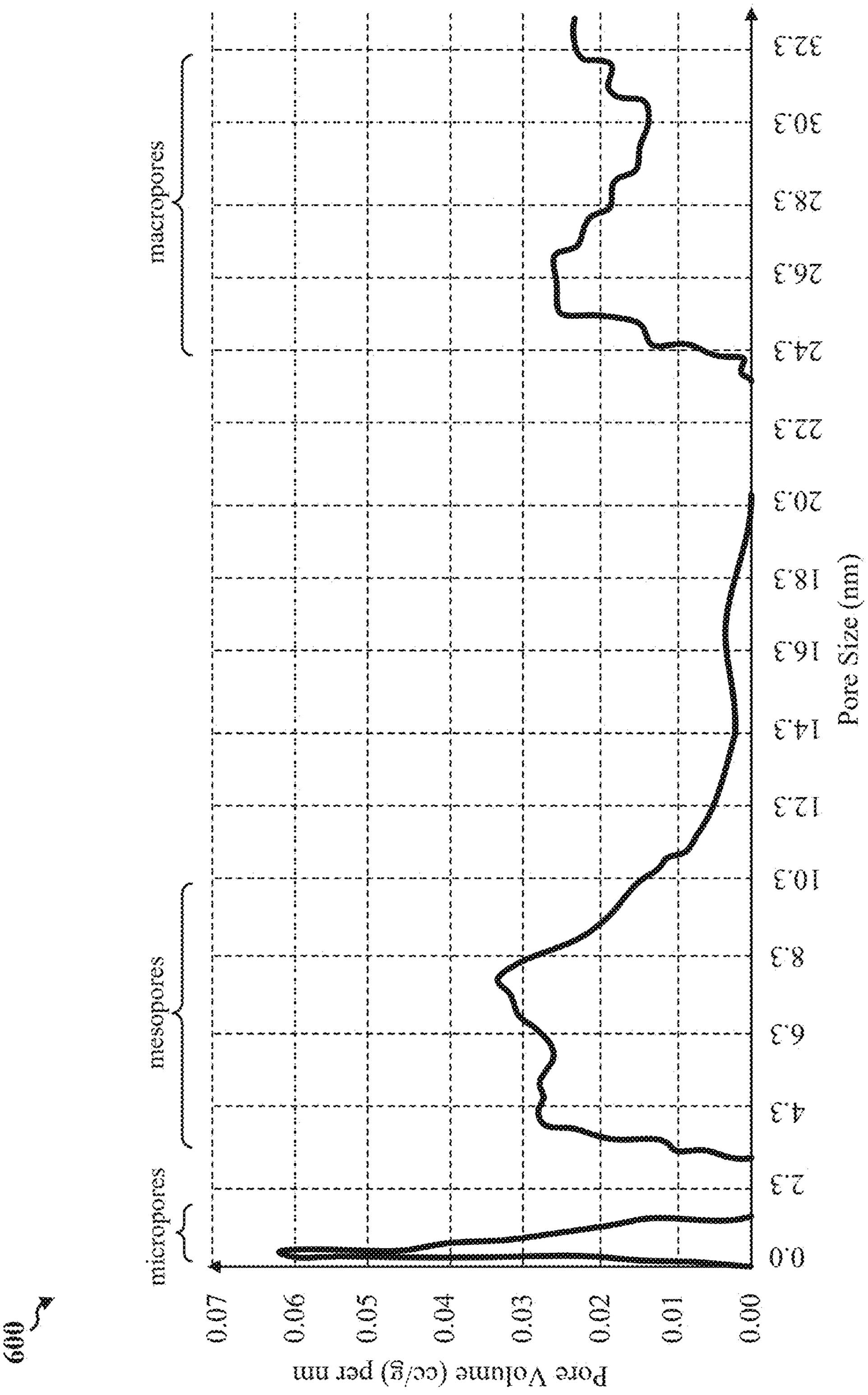
FIG. 6 shows a graph illustrating an example pore volume distribution of an example carbon-based filler including 3DG carbons, according to some implementations.

FIG. 6 shows a graph 600 illustrating an example pore volume distribution of a carbon-based filler including 3DG carbons, according to some implementations. As shown in graph 600, pores associated with a relatively high pore volume may have a relatively low pore size, for example, such that the pore size generally increases as the pore volume decreases. Additionally, pores having a pore size less than approximately 1 nm may be referred to as micropores, pores having a pore size between approximately 3 and approximately 11 nm may be referred to as mesopores, and pores having a pore size greater than approximately 24 nm may be referred to as macropores.

In some implementations, the 3DG carbons described above may be sensitized prior to being incorporated as an additive or filler in one or more formulations of cementitious materials. In some examples, "sensitized" 3DG carbons may include the product resulting from breaking up of agglomerates of 3DG carbons to nanoparticles to increase the surface area of the 3DG carbons. In some other examples, "sensitized" 3DG carbons may include the product resulting from treating the surfaces of 3DG carbon agglomerates or 3DG carbon nanoparticles to produce functional groups linked to the surfaces of the 3DG carbons. In some instances, surface functional groups may increase the hydrophilicity of 3DG carbons and improve the dispersion of the 3DG carbons in aqueous media, for example water, and in cementitious materials.

In some implementations, "sensitized" 3DG carbons may include the product resulting from ozone treatment of the 3DG carbons. Ozone treated 3DG carbons may include polar surface functional groups which may be reactive in some example cementitious materials. Alternately, the polar surface functional group may enhance the dispersion of the 3DG carbons (also referred to herein as carbon filler) in cementitious materials. In some instances, ozone oxidation treatment may also reduce the particle size of the carbon filler, which may also improve the dispersion of the carbon filler in the cementitious materials. In some implementations, dispersion of the oxidized carbon filler may also improve the hydration reactions associated with cementitious materials and enhance the mechanical properties and durability of cement products including concrete.

Harnessing the full potential of 3DG carbons to improve the strength and durability of cement-products requires uniform dispersion of 3DG carbons in hydrophilic and polar systems, for example in water, to mitigate agglomeration of the 3DG carbons within the cement, mortar, or concrete formulations. Agglomeration or clumping may reduce the beneficial enhancement in mechanical properties due to the addition of 3DG carbons in cement, mortar, or concrete formulations. Surface functionalization of 3DG carbons may disperse, size separate, and stabilize the 3DG carbons in a hydrophilic system. Ozone oxidation may produce oxygen-containing functional groups in and/or on the surfaces of 3DG carbons described herein. In some instances, surface functional groups may include one or more of oxygen containing functional groups including one or more of epoxide (C—O—C, two carbons and oxygen forming a three-membered ring structure), hydroxyl (—OH), ether (C—O—C), ketone (O—C—O), or carboxylic acid (—COOH) groups. In some other examples, the 3DG carbons may be surface etched using methods including $CO_2$ etching to create pores on the external surface of the agglomerates and to increase the surface area of the 3DG carbons.

Figure 7A:
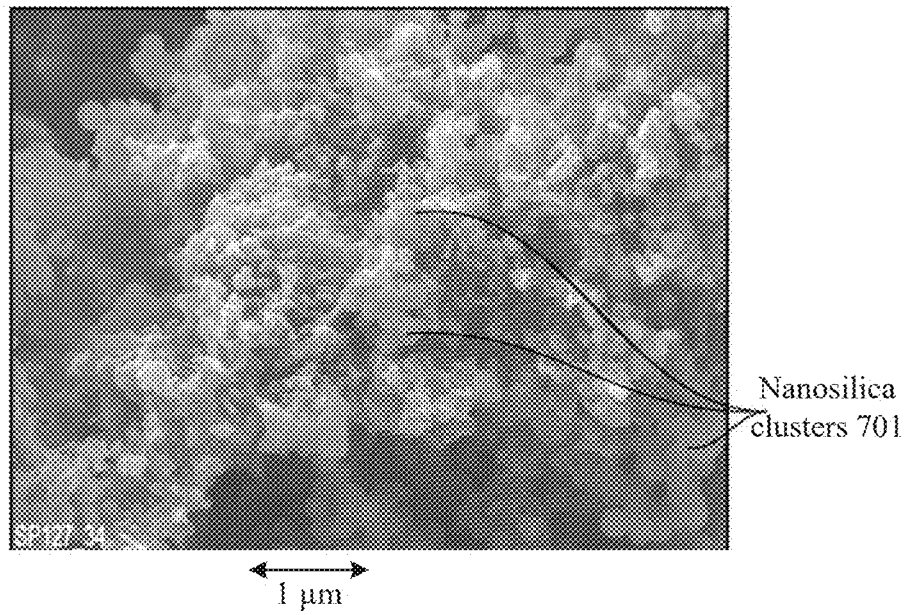
FIG. 7A shows SEM micrographs of 3DG carbons functionalized with spherical nano-silica particles and associated clusters, according to some implementations.
Figure 7A:
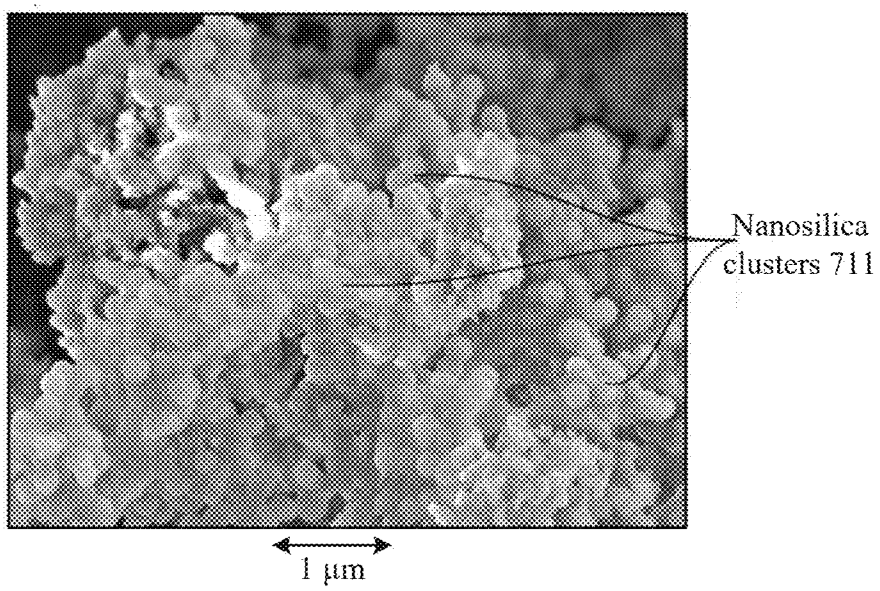

In some implementations, nano-silica particles anchored in 3DG carbons surfaces, micro-confined in the 3DG carbons, or nano-confined in the open porous scaffold structure 307 (see FIG. 3A) may function as a nucleating agent for C-S-H formed during the hydration process. FIG. 7A shows SEM micrographs 700A and 700A' of 3DG carbons functionalized with spherical nano-silica particles and "string of pearls" clusters, according to some implementations. That is, nano-silica particles or nano-silica particle "string of pearls" clusters 701 and 711 in 3DG carbons in the cement compositions described below may function as distributed catalytic sites, and as such, as seeding agents for C-S-H during hydration and subsequent growth of C-S-H polymeric chains in the cement matrix. The hydration process may be accelerated due to improved dissolution of C3S in water and acceleration of the pozzolanic activity of the SCMs to convert C-H to C-S-H. Further 3DG carbons functionalized with nano-silica may anchor C-S-H polymeric chains and may provide structural reinforcement during hydration and setting.

Figure 7B:
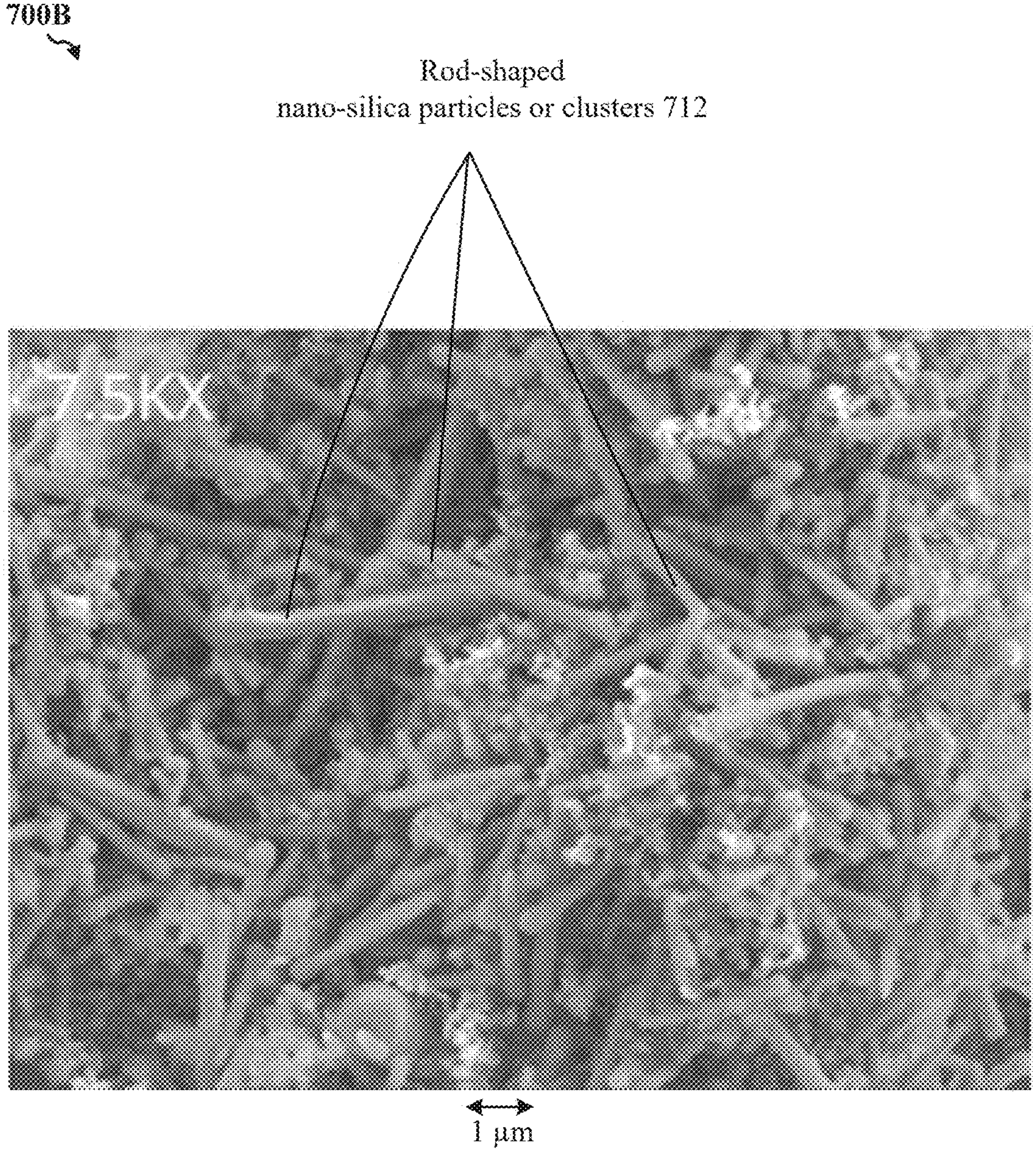
FIG. 7B shows a SEM micrograph of 3DG carbons functionalized with rod-shaped nano-silica particles and associated clusters, according to some implementations.

FIG. 7B shows a scanning electron microscopy ("SEM") micrograph 700B of 3DG carbons functionalized with nano-silica particles and rod-shaped clusters, according to some implementations. As can be seen, and in contrast to the nano-silica particles shown in micrographs 700A and 700A', nano-silica particles 712 may be disposed as tubular or rod-shaped particles and clusters on the surface of 3DG carbons. Additional details related to the hydration of cement formulations including 3DG carbons surface functionalized with nano-silica are described in Example 1 in this disclosure.

Table 1 summarizes the anticipated benefits of cement compositions including 3DG carbons as fillers or additives:

TABLE 1

Summary of benefits of cement composition including 3DG carbons.

| Material Property enhancement | Example mechanism |
|---|---|
| Improved tensile strength | 3DG carbons may form nucleation sites for forming cement calcium silicate hydrate ("C-S-H") gels during hydration which subsequently controls grain size and microstructural density of the cementitious product including concrete. The beneficial effect of 3DG carbons may be modulated by morphology, surface area and surface chemistry (e.g., functionalization) of 3DG carbons. 3DG carbon morphology, surface area and surface chemistry may be tuned. |

TABLE 1-continued

Summary of benefits of cement composition including 3DG carbons.

| Material Property enhancement | Example mechanism |
|---|---|
| 3DG carbons may augment rebar or function as a substitute for rebar for mechanical reinforcement | Utilize the high tensile strength of 3DG carbons to improve the mechanical strength of the cement-based product. An electric field may be applied to the concrete mixture to align graphene particles in 3DG carbons to mimic rebar. Unlike rebar, the 3DG carbons may be more uniformly distributed throughout the thickness of the cement-based product. Reduced amounts of rebar may be required with cements including 3DG carbons. |
| Crack mitigation | 3DG carbons may function as "roadblocks" to the propagation of micro-cracks, thus reducing or mitigating crack growth, and in particular, during ambient temperature thermal cycling. |
| Permeability reduction to $O_2$, $H_2O$, $Cl_2$, acids, which may enhance durability of concrete | 3DG carbons interact with OPC, reduce grain size during hydration/curing, which may result in a dense matrix of cement grains. Porosity of the cement-based product may be reduced. The cement-based product may be more impervious to ambient air, water, chlorine, acids, and sulfates commonly found in construction sites. The tortuous porous network in 3DG carbons may localize possible penetration of chemicals. |
| Crack healing (autogenous self-healing) | Crack healing may be realized via self-assembly of graphene at a crack location. Graphene may be chemically modified to have two separate surfaces: a hydrophobic and a hydrophilic surface. |
| Chloride permeability reduction | 3DG carbons may densify the cement matrix, which reduces chloride migration in concretes and mortars made with 3DG carbons, and is thus important for the long-term durability of cement-based products. |

In some implementations, 3DG carbons may be functionalized in situ—that is, within the reactor during the production of 3DG carbons. In some implementations, 3DG carbons may be functionalized using separate post-production processing steps. For example, 3DG carbons may be surface oxidized by ozone treatment. The approximate oxygen content associated with the oxygen containing functional groups and measured using instrumental gas analysis (IGA-O) may be between approximately 1 wt % and approximately 25 wt %. The approximate atomic content of oxygen (O)-containing functional groups may be between approximately 10 at % and 50 at %. Using X-ray photoelectron spectroscopy ("XPS") composition measurements, the C—O—C functional group concentration on 3DG carbons may be between approximately 45 at % and 55 at %. The C—C functional groups concentration may be between approximately 45 at % and approximately 55 at % and the O—C—O functional group concentration may be between approximately 5 at % and approximately 10 at %. One or more of the example functional groups described herein may be disposed as surface functional groups on 3DG carbons. In other implementations, one or more of the example functional groups described herein may be disposed within the porous structure of the 3DG carbons.

Synthesis and/or growth of 3DG carbons including CNOs may be produced by thermal cracking of hydrocarbon feedstock as disclosed in one or more of U.S. Pat. Nos. 9,862,602, 10,112,837, 11,053,121, and U.S. Pat. Pub. No. 2021/0292170, all of which are incorporated by reference herein in their respective entireties. The 3DG carbons including CNOs may also be surface functionalized as previously described herein.

In some instances, a concrete composition may include approximately 14 wt % ordinary Portland cement, approximately 31 wt % fine aggregate, approximately 47 wt % coarse aggregate, and approximately 8 wt % water.

In some implementations, the amount of 3DG carbons in an example concrete composition may be approximately 0.1% by weight of binder ("bwob"). In some other implementations, the amount of 3DG carbons in a concrete composition may be less than 0.2% bwob. In some instances, a concrete composition including 3DG carbons may replace between approximately 20 wt % and approximately 30 wt % of cement with one or more of an SCM, fine aggregates, or coarse aggregates.

In some implementations, an example concrete composition including 3DG carbons may include between approximately 13 wt % and approximately 14 wt % ordinary Portland cement, approximately 47% coarse aggregates, approximately 31 wt % fine aggregates, approximately 8 wt % water, and approximately 0.06 wt % 3DG carbons by weight of binder ("bwob"). In some other implementations, an example concrete composition including 3DG carbons may include between approximately 9 wt % and approximately 10 wt % ordinary Portland cement, approximately 51 wt % coarse aggregates, approximately 31 wt % fine aggregates, approximately 8 wt % water, and approximately 0.06 wt % 3DG carbons bwob.

In some implementations, a concrete composition including 3DG carbons may include between approximately 9 wt % and 10 wt % ordinary Portland cement, approximately 51% coarse aggregates, approximately 31 wt % fine aggregates, approximately 8 wt % water, and approximately 0.02 wt % 3DG carbons bwob.

As previously described herein, high performance concrete ("HPC") generally refers to concrete that is characterized by improved compressive strength and durability relative to the compressive strength and durability, respectively, of regular concrete. High performance concrete may be used in the construction of bridges, tunnels and other infrastructure that require enhanced strength, durability, enhanced resistance to salt and water migration, and reduced crack formation. Without being bound by any particular theory, compositions of concrete including 3DG carbons may be tuned to further increase mechanical properties, for example, increasing compressive strength to meet the requirements of high-performance concrete ("HPC"). Concrete formulated with 3DG carbons may increase the lifespan of concrete roads and bridges. Concrete formulated with 3DG carbons may also substantially reduce the need for remedial repair of transportation structures.

In some implementations, a concrete composition may include a binder including one or more of ordinary Portland cement, slag, or silica fume, aggregates, a superplasticizer, and a carbon-based filler including 3DG carbons. The 3DG carbons may include flaky graphene and nodular graphene. In some instance, the 3DG carbons may also include graphitic carbon. In some examples, aggregates associated with concrete compositions may include one or more of fine aggregates or coarse aggregates. An example of a fine aggregate may include sand. Examples of coarse aggregates may include one or more of gravel or crushed stone. Slag may include byproduct materials that include metal oxides, silica, and other impurities associated with smelting or refining of metals.

In some implementations, the example carbon-based filler including 3DG carbons may include one or more of oxygen containing functional groups, oxidized carbon, nano-silica particles, or nano-silica functional groups disposed on one or more of the surfaces of the 3DG carbons or within the 3DG carbons.

In some implementations, a concrete composition including 3DG carbons may not include metakaolin, limestone, and other similar non-limiting supplementary cementitious example materials typically found in limestone calcined cement ("LC3"). In some instances, the compressive strength of a concrete composition including 3DG carbons and measured using ASTM C39 at a hydration period of 28 days may be at least 50 MPa. In some examples, the compressive strength of a concrete composition including 3DG carbons and measured using ASTM C39 at a hydration period of 28 days may be between approximately 55 MPa and approximately 100 MPa. Accordingly, a concrete composition as described above may be considered as a high-performance concrete ("HPC") composition.

In some implementations, a binder associated with a high performance concrete composition may include slag at a concentration of between approximately 5% by weight of binder ("bwob") and approximately 80% bwob. In some instances, a binder associated with a high performance concrete composition may include silica fume at a concentration of between approximately 0.5% by weight of binder ("bwob") and approximately 8% bwob. Silica fume includes a powdered silica byproduct associated with the production of silicon.

In some implementations, the amount of the aggregates associated with a high performance concrete composition may be between approximately 10% by weight of binder ("bwob") and approximately 60% bwob.

In some implementations, the amount of the superplasticizer associated with a high performance concrete composition may be between approximately 0.05% by weight of binder ("bwob") and approximately 2% bwob.

In some implementations, a superplasticizer associated with a high performance concrete composition may include one or more of polycarboxylate ether, sulfonated naphthalene formaldehyde condensate, sulfonated melamine formaldehyde condensate, or acetone formaldehyde condensate.

In some implementations, the amount of the 3DG carbons associated with a high performance concrete composition may be between approximately 0.05% by weight of binder ("bwob") and approximately 0.15% bwob. In some instances, the amount of the 3DG carbons associated with a high performance concrete composition may be between approximately 0.05% bwob and approximately 2% bwob.

In some implementations, oxygen containing functional groups associated with the 3DG carbons may include one or more of epoxide (C—O—C), hydroxyl (—OH), ether (C—O—C), ketone (O—C═O), or carboxylic acid (—COOH) groups.

In some other implementations, the oxygen concentration based on the oxygen containing functional groups associated with the 3DG carbons may be between approximately 1 wt % and 25 wt %. In some instances, the oxygen concentration associated with oxygen containing functional groups disposed on the surfaces of the 3DG carbons may be between approximately 4 atomic percentage (at %) and 5 at %.

In some implementations, the carbon-based filler including one or more of 3DG carbons including flaky graphene and nodular graphene may be added at a construction site during the mixing of cement and other materials to produce cement-based products including concrete. In some instances, the 3DG carbons may include graphitic carbon. As previously described herein, to prevent the clumping of the 3DG carbons and enable good dispersion of the 3DG carbons in a slurry formed during the mixing process, the 3DG carbons may be sensitized to include oxygen functional groups. In some instances, the 3DG carbons may be formulated as a liquid admixture and the liquid admixture may be added onsite during the mixing of cement and other materials to produce cement-based products including concrete. Several examples of liquid admixtures including 3DG carbons are described below in this disclosure as non-limiting examples.

In some implementations, a liquid admixture associated with cement-based products described herein may include a carbon-based filler including flaky graphene and nodular graphene ("3DG carbons"), a surfactant, and water. In some instances, the 3DG carbons may also include graphitic carbon. In some examples, the example liquid admixture including 3DG carbons may be formulated as a suspension and may be mixed in with cement and other materials, during the production of concrete, high performance concrete, or mortar. In some instances, the concentration of 3DG carbons in a liquid admixture may be between approximately 10 g/liter and approximately 100 g/liter. In some other instances, the 3DG carbons may include one or more of oxygen containing functional groups, oxidized carbon, nano-silica particles, or nano-silica functional groups disposed on one or more of the surfaces of the 3DG carbons or within the 3DG carbons. In some examples, the pH of the liquid admixture may be between approximately 8 and approximately 12. Without being bound by any particular theory, adding 3DG carbons to concrete formulations may enhance the compressive strength of concrete. Additionally, one or more of the weight of aggregates or the weight of binder materials, for example the weight associated with silica fume, may be reduced in concrete formulations including the 3DG carbons to yield a light-weighted concrete characterized by enhanced compressive strength.

In some implementations, the flaky graphene associated with a liquid admixture as described above may include one or more few layer graphene ("FLG"), or many layer graphene ("MLG"). In some instances, the 3DG carbons may include between approximately 5 and approximately 15 graphene layers.

In some implementations, a surfactant associated with a liquid admixture as described above may include one or more of Ethacryl G, polycarboxylate ether, a pluronic surfactant (also referred to herein as a poloxamer), or sodium dodecylbenzenesulfonate ("SDBS").

In some implementations, another liquid admixture associated with a cement-based product may be free of any surfactants and may include a carbon-based filler ("3DG carbons") and water. In some other implementations, the liquid admixture including the 3DG carbons may be formulated as a suspension and may be mixed in with cement and other materials, during the production of concrete, high performance concrete, or mortar. In some instances, the concentration of the 3DG carbons in the liquid admixture may be between approximately 1 g/liter and approximately 10 g/liter. In some other instances, the 3DG carbons may include one or more of oxygen containing functional groups, oxidized carbon, nano-silica particles, or nano-silica functional groups disposed on one or more of the surfaces of the 3DG carbons or within the 3DG carbons. In some implementations, the 3DG carbons may include one or more few layer graphene ("FLG"), or many layer graphene ("MLG"). In some instances, the 3DG carbons may include between approximately 5 and approximately 15 graphene layers.

In some implementations, the 3DG carbons may be characterized by a Raman spectroscopy signature having an $I_D/I_G$ ratio of less than 1. In some instances, the 3DG carbons may be characterized by a Raman spectroscopy signature having an $I_{2D}/I_G$ ratio of less than 1. In some other instances, the average size of the 3DG carbons may be between approximately 90 nm and approximately 110 nm.

In some implementations, another liquid admixture associated with cement-based products may include one or more of calcium-silicate-hydrates ("C-S-H") or calcium-aluminum-silicate-hydrates ("C-A-S-H"), one or more organic acids, and water. Without being bound by any particular theory, the one or more organic acids in the liquid admixture associated with cement-based products may improve viscosity and workability, modulate the setting time of cement, and gradually increase the strength of cement or concrete to yield a product characterized by improved long-term strength. The one or more organic acids may be considered as anionic binding agents or viscosity modifiers that break down the gelation of C—S—H or C-A-S-H nanostructures and improve flow and workability.

In some instances, the pH of the liquid admixture may be between approximately 9.5 and approximately 13. In some instances, the pH of the liquid admixture may be approximately 11.5. In some instances, one or more of the calcium-silicate-hydrates ("C-S-H") or the calcium-aluminum-silicate-hydrates ("C-A-S-H") may be disposed as nanoparticles in the liquid admixture. In some other instances, the liquid admixture may further include nanoparticles of one or more of calcium, aluminum, or a silicate. In some examples, the viscosity of the example liquid admixture may be between approximately 1 centipoise (cP) and approximately 2000 cP at a shear rate of 100 $s^{-1}$. For the sake of clarity 1 cP corresponds to 1 millipascal-second (mPa·s).

In some implementations, a liquid admixture may include one or more of calcium-silicate-hydrates ("C-S-H") or calcium-aluminum-silicate-hydrates ("C-A-S-H"). In some implementations, one or more of the calcium-silicate-hydrates ("C-S-H") or the calcium-aluminum-silicate-hydrates ("C-A-S-H") may be disposed as nanoparticles in the liquid admixture. In some other instances, the liquid admixture may further include nanoparticles of one or more of calcium, aluminum, or a silicate. Example of silicates may include a salt including an anion of the general formula $$SiO_{4-x}^{4-2x},$$

where a value for x is generally $0 \le x < 2$.

Silicates may include one or more of orthosilicates, metasilicates, or pyrosilicates. When the liquid admixture is added to cement or concrete formulations, C-S-H or C-A-S-H nanoparticles may accelerate the hydration and setting of cement and react with calcium hydroxide in cement to form additional C-S-H nanoparticles or nucleation sites for the hydration reaction. The C-S-H nanoparticles may also be referred to as C-S-H nanofoils. C-S-H nanofoils may be characterized by C-S-H layered structures that function as nucleation sites during the formation of C-A-S-H nanostructures. Similarly, C-A-S-H nanoparticles may also be referred to as C-A-S-H nanofoils.

In some implementations, the elemental composition of the liquid admixture may include between approximately 1.5 atomic percentage (at %) and approximately 2.5 at % calcium, between approximately 0.05 at % and approximately 1 at % aluminum, and between approximately 1 at % and approximately 2 at % silicon. In some instances, the elemental composition of the liquid admixture may include between approximately 1 atomic percentage (at %) and approximately 15 at % calcium, between approximately 0.05 at % and approximately 5 at % aluminum, and between approximately 1 at % and approximately 15 at % silicon.

In some implementations, the one or more organic acids may include one or more of tartaric acid, citric acid, succinic acid, or mixtures thereof. In some examples, the concentration of the one or more organic acids in the liquid admixture may be between approximately 0.1 wt % and approximately 0.8 wt %.

In some implementations, a liquid admixture may further include a superplasticizer. In some examples, a superplasticizer may include one or more of polycarboxylate ether, sulfonated naphthalene formaldehyde condensate, sulfonated melamine formaldehyde condensate, or acetone formaldehyde condensate. In some other examples, the amount of the superplasticizer in the liquid admixture may be between approximately 1 wt % and approximately 2 wt %.

In some implementations, a liquid admixture may further include a carbon-based filler including flaky graphene and nodular graphene ("3DG carbons"). In some examples, the 3DG carbon may also include graphitic carbon. In some instances, the concentration of the 3DG carbons in the liquid admixture is between approximately 10 g/liter and approximately 100 g/liter. Without being bound by any particular theory, the 3DG carbons may improve workability, viscosity modification, and enhance the mechanical strength of cement or concrete formulation including the liquid admixtures described herein.

In some implementations, the graphene flakes may include one or more few layer graphene ("FLG"), or many layer graphene ("MLG"). In some instances, the 3DG carbons may include between approximately 5 and approximately 15 graphene layers.

In some implementations, the 3DG carbons may be characterized by a Raman spectroscopy signature having an $I_D/I_G$ ratio of less than 1. In some other instances, the 3DG carbons may be characterized by a Raman spectroscopy signature having an $I_{2D}/I_G$ ratio of less than 1. In some examples, the average particle size of the 3DG carbons may be between approximately 90 nm and approximately 110 nm.

In some implementations, the 3DG carbons may include one or more of oxygen containing functional groups, oxidized carbon, nano-silica particles, or nano-silica functional groups disposed on one or more surfaces of the 3DG carbons or within the 3DG carbons. In some instances, the oxygen containing functional groups associated with the 3DG carbons may include one or more of epoxide (C—O—C), hydroxyl (—OH), ether (C—O—C), ketone (O—C—O), or carboxylic acid (—COOH) groups.

Figure 8:
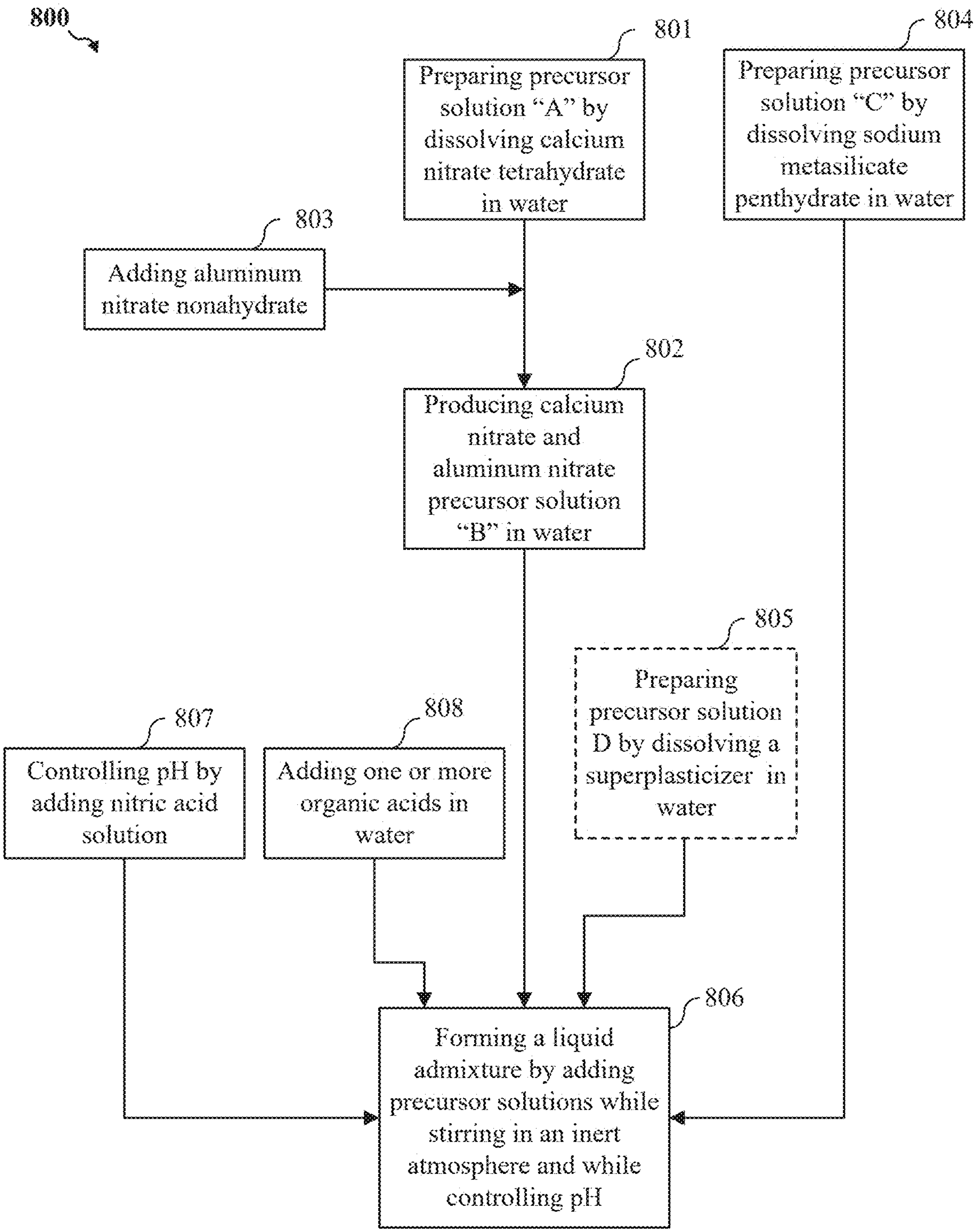
FIG. 8 shows an illustrative flowchart depicting an operation for producing a liquid admixture associated with cement-based products, according to some implementations.

FIG. 8 shows an illustrative flowchart 800 depicting an operation 800' for producing a liquid admixture associated with cement-based products, according to some implementations. In some implementations, operation 800' may begin at 801 with preparing precursor solution "A" by dissolving calcium nitrate tetrahydrate ($Ca(NO_3)_2 \cdot 4H_2O$) in deionized water. In some instances, the concentration of calcium nitrate in precursor solution "A" may be approximately 2 molar (M). Referring to operation 800', the molar composition corresponds to the moles of each salt (or the superplasticizer) in the respective precursor solution.

In some implementations, operation 800' may continue at 802 with producing precursor solution "B" by adding, at 803, aluminum nitrate nonahydrate ($Al(NO_3)_3 \cdot 9H_2O$) to precursor solution "A." In some instances, the concentration of aluminum nitrate in precursor solution "B" may be approximately 0.1 M. In some other instances, the aluminum nitrate nonahydrate to precursor solution "A" weight ratio may be approximately 0.04.

In some implementations, operation 800' may continue at 804 with producing a precursor solution "C" by dissolving sodium metasilicate pentahydrate ($Na_2SiO_3 \cdot 5H_2O$) in deionized water at an elevated temperature. In some instances, an example elevated temperature may be approximately 70° C. In some other instances, the concentration of sodium metasilicate in precursor solution "C" may be approximately 2 M.

In some implementations, operation 800' may continue at 805 with producing a precursor solution "D" by dissolving a superplasticizer in deionized water in a reaction vessel (also referred to herein as a reactor). In some instances, the pH of the solution "D" may be controlled to approximately 11.5 by adding 1 M sodium hydroxide (NaOH) solution. In some instances, the concentration of the superplasticizer in solution "D" may be approximately 0.05 M. In some implementations, a superplasticizer may include one or more of polycarboxylate ether, sulfonated naphthalene formaldehyde condensate, sulfonated melamine formaldehyde condensate, or acetone formaldehyde condensate. Example of superplasticizers may include a polycarboxylate ether, for example, Arkema's Ethacryl product or BASF's Liquiment® product. Those skilled in the art will appreciate that operation 800' is described by way of example only, and that other variations may exist without departing from the scope and spirit of the present implementations. For example, a liquid admixture as described herein may be prepared using the example operation 800' without including precursor solution "D" in the reaction vessel if a concrete or cement formulation includes a superplasticizer.

In some implementations, operation 800' may continue at 806 with simultaneously adding precursor solutions "B" and "C" to precursor solution "D" disposed in the reaction vessel while stirring under in an inert atmosphere. In some examples, an inert atmosphere may include a nitrogen gas blanket, or an inert gas blanket. In some examples, solutions "B" and "C" may be sparged with nitrogen gas or an inert gas prior to the simultaneously adding operation 806. In some other examples, solutions "B" and "C" may be sparged with nitrogen gas or an inert gas for approximately 30 min. prior to the simultaneously adding operation 806. In some instances, the precursor solutions "B" and "C" may be simultaneously added dropwise at 806 to produce a reaction mixture in the reaction vessel. In some other instances, at 806, the precursor solutions "B" and "C" may be added simultaneously dropwise over a reaction time of approximately 60 min. For the sake of clarity, the reaction mixture present in the reaction vessel at the conclusion of the reaction time may be referred to as the liquid admixture.

In some implementations, the stirring speed associated with a magnetic stirrer or mechanical stirrer used for stirring the reaction mixture may be approximately 120 revolutions per minute ("RPM"). In some examples, at 807, the pH of the reactant mixture may be controlled by simultaneously adding, along with solutions "B" and "C", an effective amount of a nitric acid solution at a concentration of between approximately 1 molar (M) and approximately 3 molar (M) for controlling the pH of the reaction mixture at approximately 11.5. In some examples, the pH of the liquid admixture may be controlled to between approximately 9.5 and approximately 13.

In some implementations, at 808, one or more organic acids may be added to the reaction mixture while stirring to ensure uniform distribution of the one or more organic acids in the reaction mixture. In some examples, the concentration of the one or more organic acids in water may be approximately 10 wt %. In some examples, the one or more organic acids may include one or more of tartaric acid, citric acid, succinic acid, or mixtures thereof. In some examples, the concentration of the one or more organic acids in the liquid admixture may be between approximately 0.1 wt % and approximately 0.8 wt %.

In some implementations, a method of preparing a liquid admixture for cement-based products may include preparing a first precursor solution including calcium nitrate and aluminum nitrate in water, preparing a second precursor solution including sodium metasilicate in water, preparing a third precursor solution including a superplasticizer in water at a pH of approximately 11.5, producing a reaction mixture by simultaneously adding while stirring, under an inert gas blanket, the first precursor solution and the second precursor solution to the third precursor solution while controlling the pH of the reaction mixture, and adding one or more organic acids to the reaction mixture, wherein a concentration of the one or more organic acids in the reaction mixture is between approximately 0.1 wt % and approximately 0.8 wt %. In some other instances, the molar composition associated with a feedstock including the second precursor solution, the third precursor solution, and the fourth precursor solution and expressed as $$Ca^{2+}: \text{silicate}\left(SiO_3^{2-}\right): Al^{3+}: \text{superplasticizer}$$

may be approximately 1.3:1.3:0.07:0.05. In some instances, a superplasticizer may include BASF's Liquiment® 5581F. In some instances, the concentration of sodium metasilicate in the second precursor solution may be approximately 2 molar (M).

In some implementations, controlling the pH of the reaction mixture may include simultaneously adding, together with the first precursor solution and the second precursor solution, an effective amount of nitric acid solution at a concentration of between approximately 1 molar (M) and approximately 3 molar (M) for maintaining the pH of the reaction mixture at approximately 11.5. In some examples, the viscosity of the example liquid admixture may be between approximately 1 centipoise (cP) and approximately 2000 cP at a shear rate of 100 $s^{-1}$.

In some implementations, preparing the first precursor solution may include adding aluminum nitrate nonahydrate to a fourth precursor solution including calcium nitrate in water at an aluminum nitrate nonahydrate to fourth precursor solution weight ratio of approximately 0.04.

In some implementations, a concentration of sodium metasilicate in the second precursor solution may be approximately 2 molar (M). In some other implementations, the concentration of the superplasticizer in the third precursor solution may be approximately 0.05 molar (M). In some instances, an example plasticizer may include a polycarboxylate ether. In some instances, the one or more organic acids may include one or more of tartaric acid, citric acid, succinic acid, or mixtures thereof.

In some implementations, a liquid admixture associated with cement or concrete formulations may be prepared using the example operation 800' described above by using a reaction feedstock including approximately 25.4 wt % precursor solution “B”, approximately 26.4 wt % precursor solution “C” (active component concentration of approximately 2 M), approximately 46.6 wt % precursor solution “D” (active component concentration of approximately 0.05 M) and approximately 1.6 wt % organic acid. Precursor solution “B” may be prepared by adding aluminum nitrate nonahydrate to precursor solution “A” at an aluminum nitrate nonahydrate to precursor solution “A” weight ratio of approximately 0.04. Precursor solution “A” may be characterized by a concentration of approximately 2 M.

In some implementations, a concrete composition may include a binder including one or more of ordinary Portland cement, slag, or silica fume, and one or more of one or more of calcium-silicate-hydrates (“C-S-H”) or calcium-aluminum-silicate-hydrates (“C-A-S-H”) disposed in a liquid admixture associated with the binder. In some instances, the amount of the one or more of C-S-H or C-A-S-H in the liquid admixture may be between approximately 0.05% by weight of binder (bwob) and approximately 2.5 wt % by weight of binder (bwob). In instances, the liquid admixture may be added on-site, for example, a construction site, during the preparation of the concrete.

In some implementations, the liquid admixture may further include one or more organic acids, and water. In some examples, a pH of the liquid admixture may be between approximately 9.5 and approximately 13. In some other examples, the pH of the liquid admixture may be approximately 11.5. The example liquid admixtures may be used in cement-based products including formulations associated with high-performance concrete and ultra-high performance concrete and packaged concrete mixtures. Examples of packaged concrete include Quikrete®. An example liquid admixture may also be used in quick set cement formulations, for example Rapid Set®.

In some implementations, the one or more organic acids in the liquid admixture may include one or more of tartaric acid, citric acid, succinic acid, or mixtures thereof. In some instances, a concentration of the one or more organic acids in the liquid admixture may be between approximately 0.1 wt % and approximately 0.8 wt %.

In some implementations, the liquid admixture may further include a carbon-based filler including flaky graphene and nodular graphene (“3DG carbons”). In some instances, the 3DG carbons may also include graphitic carbons. In some examples, the concentration of the 3DG carbons in the liquid admixture may be between approximately 10 g/liter and approximately 100 g/liter. Additional details related to 3DG carbons were previously described in this disclosure.

In some implementations, the amount of the aggregates in a concrete composition may be between approximately 10% by weight of binder (bwob) and approximately 60% bwob.

In some implementations, another liquid admixture associated with a cement-based product may include one or more of calcium-silicate-hydrates (“C-S-H”) or calcium-aluminum-silicate-hydrates (“C-A-S-H”), one or more or elemental zinc or a nitrate salt including zinc, and water. In some instances, a pH of the liquid admixture may be between approximately 9.5 and approximately 13. In some instances, a pH of the liquid admixture may be approximately 11.7. Without being bound by any particular theory, zinc may modulate a mean chain length (“MCL”) of the silicate chains corresponding to the one or more of the calcium-silicate-hydrates (“C—S-H”) or the calcium-aluminum-silicate-hydrates (“C-A-S-H”) in the liquid admixture or in cement or concrete formulation. Accordingly, the short term strength and long term strength of cement or concrete formulations including the example liquid admixture including zinc may be modulated to conform to the requirements imposed by a wide range of applications.

The mean chain length of the silicate chains may be estimated using analytical tools including nuclear magnetic resonance (“NMR”) spectroscopy and may be estimated using the following equation:

$$MCL = \frac{2[Q^1 + Q^2 + \frac{3}{2}Q^2(\mathrm{Al})}{Q^1},$$

where $Q^1$ represents the relative peak intensity of the NMR spectra peak corresponding to the “end-of-chain” silicate tetrahedron or moiety with one bridging oxygen atom, $Q^2$ represents the relative peak intensity of the NMR spectra peak corresponding to the “middle-of-chain” silicate “pairing or bridging” moiety with two bridging oxygen atoms, and $Q^2(\mathrm{Al})$ represents the relative peak intensity of the NMR spectra peak corresponding to the silicate moiety where one silicon atom is substituted with an aluminum atom. In each case, the respective relative NMR spectra peak intensities may also be correlated to the relative amounts, for example, mole fractions of each moiety in the silicate chain. In some implementations, a mean chain length (“MCL”) of the silicate chains corresponding to the one or more of the calcium-silicate-hydrates (“C-S-H”) or the calcium-aluminum-silicate-hydrates (“C-A-S-H”) in the liquid admixture may be between approximately 2.5 and approximately 5.

In some implementations, the density corresponding to the one or more of the calcium-silicate-hydrates (“C-S-H”) or the calcium-aluminum-silicate-hydrates (“C-A-S-H”) in the liquid admixture may be between approximately 1 g/L and approximately 700 g/L. In some implementations, the density corresponding to the one or more of the calcium-silicate-hydrates (“C-S-H”) or the calcium-aluminum-silicate-hydrates (“C-A-S-H”) in the liquid admixture may be approximately 52 g/L. In some examples, the viscosity of the liquid admixture, at a shear rate of 100 $s^{-1}$, may be between approximately 1 centipoise (cP) and approximately 2000 cP. In some implementations, the atomic ratio of zinc to calcium in the liquid admixture may be between approximately 0.1:1 and approximately 1:1.

In some instances, one or more of the calcium-silicate-hydrates ("C-S-H") or the calcium-aluminum-silicate-hydrates ("C-A-S-H") may be disposed as nanoparticles in the liquid admixture. In some other instances, the liquid admixture may further include nanoparticles of one or more of calcium, aluminum, zinc, or a silicate. Examples of silicates may include a salt including an anion of the general formula $$SiO_{4-x}^{4-2x},$$

where a value for "x" is generally $0 \leq x < 2$. Examples of silicates may include one or more of orthosilicates, metasilicates, or pyrosilicates. When the example liquid admixture is added to cement or concrete formulations, C-S-H or C-A-S-H nanoparticles may accelerate the hydration and setting of cement and react with calcium hydroxide in cement to form additional C-S-H nanoparticles or nucleation sites for the hydration reaction. The C-S-H nanoparticles may also be referred to as C-S-H nanofoils. C-S-H nanofoils may be characterized by C-S-H layered structures that function as nucleation sites during the formation of C-A-S-H nanostructures. Similarly, C-A-S-H nanoparticles may also be referred to as C-A-S-H nanofoils.

In some implementations, the elemental composition of the liquid admixture may include between approximately 1 atomic percentage (at %) and approximately 2.5 at % calcium, between approximately 0.05 at % and approximately 1 at % aluminum, between approximately 1 at % and approximately 1.5 at % silicon, and between approximately 0.1 at % and approximately 1 at % zinc.

In some implementations, the liquid admixture may further include a superplasticizer. In some examples, an example superplasticizer may include one or more of polycarboxylate ether, sulfonated naphthalene formaldehyde condensate, sulfonated melamine formaldehyde condensate, or acetone formaldehyde condensate. In some other examples, the amount of superplasticizer in the liquid admixture may be between approximately 0.1 wt % and approximately 5 wt %.

In some implementations, the liquid admixture may also include a carbon-based filler including flaky graphene and nodular graphene ("3DG carbons"). Details associated with the 3DG carbons were previously described herein with reference to FIGS. 1A-1G, 3A-3C, 4A-4C, 5A-5B, and 6. In some instances, the concentration of the 3DG carbons in the liquid admixture may be between approximately 10 g/liter and approximately 100 g/liter. In some examples, the 3DG carbons may also include graphitic carbon. In some examples, the nodular graphene in the carbon-based filler may include a plurality of carbon nano-onions ("CNOs").

In some implementations, the flaky graphene may include one or more few layer graphene ("FLG"), or many layer graphene ("MLG"). In some instances, the 3DG carbons may include between approximately 5 graphene layers and approximately 15 graphene layers.

In some implementations, the 3DG carbons may be characterized by a Raman spectroscopy signature having an $I_D/I_G$ ratio of less than 1. In some other instances, the 3DG carbons may be characterized by a Raman spectroscopy signature having an $I_{2D}/I_G$ ratio of less than 1. In some examples, the average particle size of the 3DG carbons may be between approximately 90 nm and approximately 110 nm.

In some implementations, 3DG carbons including flaky graphene and nodular graphene may be characterized by a Raman spectroscopy signature having an $I_D/I_G$ ratio between approximately 0.35 and approximately 0.56. In some instances, the 3DG carbons may be characterized by a Raman spectroscopy signature having an $I_{2D}/I_G$ ratio between approximately 0.53 and approximately 0.7. An $I_{2D}/I_G$ ratio less than 2 suggests that flaky graphene associated with the carbon filler includes several layers of graphene. In some other instances, 3DG carbons may be characterized by a Raman spectroscopy signature having an $I_D/I_G$ ratio between approximately 0.35 and approximately 0.56 and an $I_{2D}/I_G$ ratio between approximately 0.53 and approximately 0.7.

In some implementations, the 3DG carbons may include one or more of oxygen containing functional groups, oxidized carbon, nano-silica particles, or nano-silica functional groups disposed on one or more surfaces of the 3DG carbons or within the 3DG carbons. In some instances, the oxygen containing functional groups associated with the 3DG carbons may include one or more of epoxide (C—O—C), hydroxyl (—OH), ether (C—O—C), ketone (O—C—O), or carboxylic acid (—COOH) groups.

Figure 9:
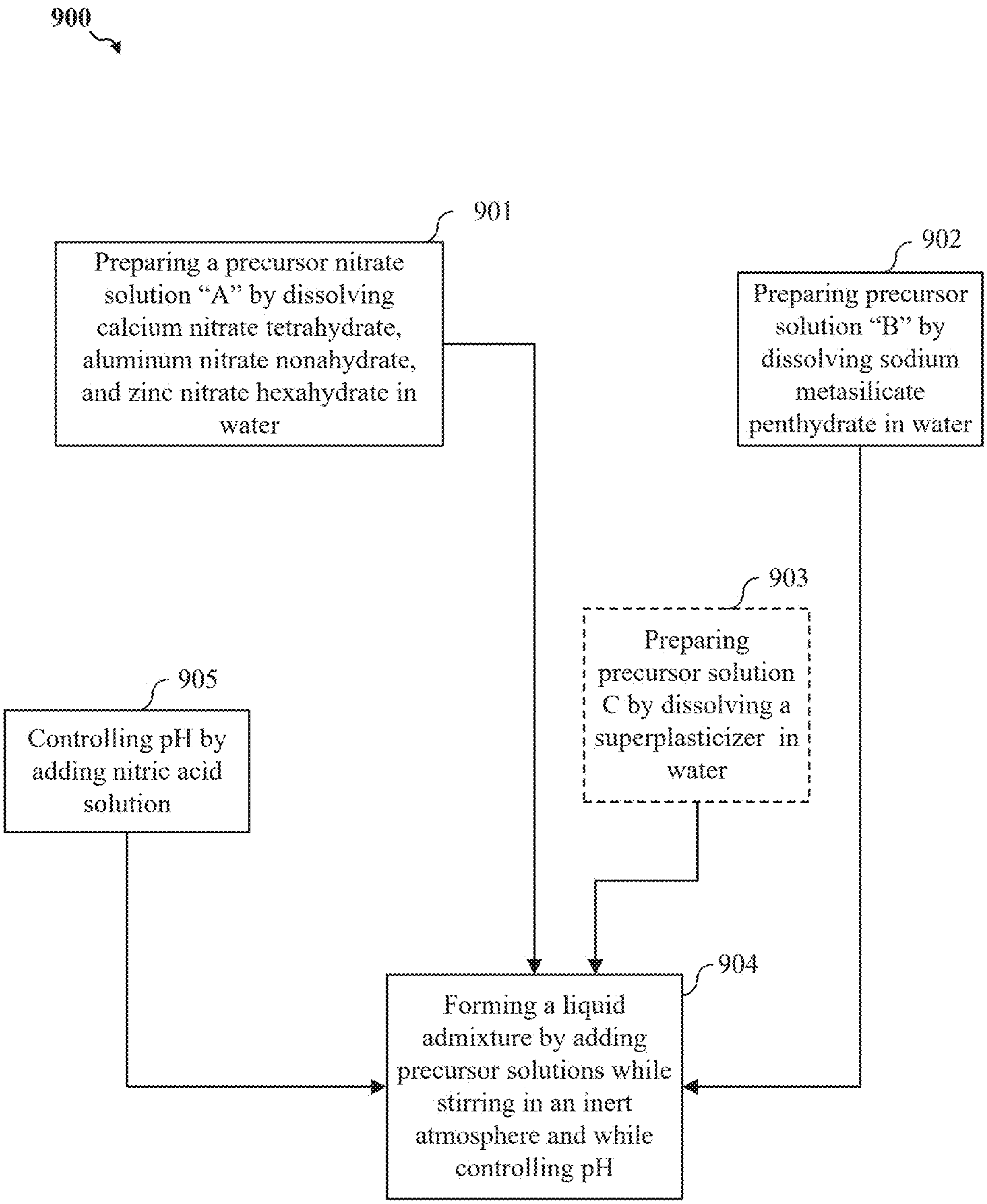
FIG. 9 shows an illustrative flowchart depicting an example operation for producing another liquid admixture for with cement-based products, according to some implementations.

FIG. 9 shows an illustrative flowchart 900 depicting an operation 900' for producing a liquid admixture for cement-based products, according to some implementations. In some implementations, operation 900' may begin at 901 with preparing a first precursor nitrate solution "A" by dissolving calcium nitrate tetrahydrate ($Ca(NO_3)_2 \cdot 4H_2O$), aluminum nitrate nonahydrate ($Al(NO_3)_3 \cdot 9H_2O$), and zinc nitrate hexahydrate ($Zn(NO_3)_2 \cdot 6H_2O$) in deionized water. In some examples, the calcium to aluminum atomic ratio in the first precursor nitrate solution may be between approximately 5 and 15. In some implementations, the calcium to aluminum atomic ratio in the first precursor nitrate solution may be approximately 13. In some instances, the calcium to zinc atomic ratio in the first precursor solution is between approximately 5 and 10. In some other instances, the calcium to zinc atomic ratio in the first precursor nitrate solution may be approximately 7.

In some implementations, operation 900' may continue at 902 with producing a precursor solution "B" by dissolving sodium metasilicate pentahydrate ($NazSiO_3 \cdot 5H_2O$) in deionized water at an elevated temperature. In some instances, the elevated temperature may be approximately 70° C. In some other instances, the concentration of sodium metasilicate in precursor solution "B" may be approximately 2 molar (M). In some other instances, the concentration of sodium metasilicate in precursor solution "B" may be approximately 1.6 molar (M).

In some implementations, operation 900' may continue at 903 with producing a precursor solution "C" by dissolving a superplasticizer in deionized water in a reaction vessel (also referred to herein as a reactor). In some instances, the pH of the solution "C" may be controlled to between approximately between 9.5 and approximately 13 by adding sodium hydroxide (NaOH) solution. In some instances, the pH of the solution "C" may be controlled to approximately between 11.7 by adding 1 M sodium hydroxide (NaOH) solution. In some instances, the concentration of the superplasticizer in precursor solution "C" may be approximately 0.05 M.

In some implementations, a superplasticizer may include one or more of polycarboxylate ether, sulfonated naphthalene formaldehyde condensate, sulfonated melamine formaldehyde condensate, or acetone formaldehyde condensate. Examples of superplasticizers may include a polycarboxylate ether, for example, Arkema's Ethacryl product or BASF's Liquiment® product. Those skilled in the art will appreciate that operation 900' is described by way of example only, and that other variations may exist without departing from the scope and spirit of the present implementations. For example, a liquid admixture as described herein may be prepared using the operation 900' without including precursor solution "C" in the reaction vessel if a concrete or cement formulation includes a superplasticizer.

In some implementations, operation 900' may continue at 904 with simultaneously adding precursor solutions "A" and "B" to precursor solution "C" disposed in a reaction vessel while stirring under in an inert atmosphere. In some examples, an inert atmosphere may include a nitrogen gas blanket, or an inert gas blanket. In some examples, solutions "A" and "B" may be sparged with nitrogen gas or an inert gas prior to the simultaneously adding operation 904. In some other examples, solutions "A" and "B" may be sparged with nitrogen gas or an inert gas for approximately 30 min. prior to the simultaneously adding operation 904. In some instances, the precursor solutions "A" and "B" may be simultaneously added dropwise at 904 to produce a reaction mixture. In some other instances, at 904, the precursor solutions "A" and "B" may be added simultaneously dropwise over a reaction time of approximately 60 min. For the sake of clarity, the reaction mixture present in the reaction vessel at the conclusion of the reaction time may be referred to as the liquid admixture.

In some other implementations, the stirring speed associated with a magnetic stirrer or mechanical stirrer used for stirring the reaction mixture may be approximately 120 revolutions per minute ("RPM"). In some examples, at 905, the pH of the reactant mixture may be controlled by simultaneously adding, along with solutions "A" and "B", an effective amount of a nitric acid solution at a concentration of between approximately 1 molar (M) and approximately 3 molar (M) for controlling the pH of the reaction mixture at approximately 11.7. In some examples, at 905, the pH of the reactant mixture may be controlled by simultaneously adding dropwise, along with solutions "A" and "B", an effective amount of a nitric acid solution at a concentration of between approximately 1 molar (M) and approximately 3 molar (M) for controlling the pH of the reaction mixture at approximately 11.7. In some examples, the pH of the liquid admixture may be controlled to between approximately 9.5 and approximately 13.

In some implementations, a method of preparing a liquid admixture for cement-based products may include preparing a first precursor solution including calcium nitrate, zinc nitrate, aluminum nitrate in water, preparing a second precursor solution including sodium metasilicate in water, preparing a third precursor solution including a superplasticizer in water at a pH of approximately between approximately 9.5 and approximately 13, and producing a reaction mixture by simultaneously adding, while stirring under an inert gas blanket, the first precursor solution and the second precursor solution to the third precursor solution while controlling the pH of the reaction mixture at between approximately 9.5 and approximately 13. In some examples, the precursor solutions "A," "B," and "C" may be added at the molar composition $$Ca^{2+}: \text{silicate}\left(SiO_3^{2-}\right): Al^{3+}: Zn^{2+}: \text{superplasticizer}$$

of approximately 1:1:0.11:0.09:0.05. In some instances, an example superplasticizer may include BASF's Liquiment® 5581F. The molar composition corresponds to the moles of each salt (or the superplasticizer) in the respective precursor solution.

In some implementations, one or more organic acids may be added (not shown in FIG. 9) to the reaction mixture corresponding to precursor solutions "A," "B," and "C" while stirring to ensure uniform distribution of the one or more organic acids in the reaction mixture. In some examples, the concentration of the one or more organic acids in water may be approximately 10 wt %. In some examples, the one or more organic acids may include one or more of tartaric acid, citric acid, succinic acid, or mixtures thereof. In some examples, the concentration of the one or more organic acids in the liquid admixture may be between approximately 0.1 wt % and approximately 0.8 wt %.

In some implementations, the density corresponding to the one or more of the calcium-silicate-hydrates ("C-S-H") or the calcium-aluminum-silicate-hydrates ("C-A-S-H") in the liquid admixture may be between approximately 1 g/L and approximately 700 g/L. In some implementations, the density corresponding to the one or more of the calcium-silicate-hydrates ("C-S-H") or the calcium-aluminum-silicate-hydrates ("C-A-S-H") in the liquid admixture, at a shear rate of 100 $s^{-1}$, may be approximately 52 g/L. In some examples, the viscosity of the example liquid admixture may be between approximately 1 centipoise (cP) and approximately 2000 cP.

In some implementations, controlling the pH of the reaction mixture includes simultaneously adding an effective amount of nitric acid solution at a concentration of between approximately 1 molar (M) and approximately 3 molar (M) for controlling the pH of the reaction mixture at between approximately 9.5 and approximately 13.

In some implementations, the calcium to aluminum atomic ratio in the first precursor solution may be between approximately 5 and 10. In some instances, the calcium to zinc atomic ratio in the first precursor solution may be between approximately 10 and 15. In some other instances, the concentration of sodium metasilicate in the second precursor solution may be approximately 2 molar (M).

In some implementations, the concentration of the superplasticizer in the third precursor solution may be between approximately 2 wt % and approximately 4 wt %. In some instances, an example of a superplasticizer may include a polycarboxylate ether.

In some implementations, a concrete composition may include a cementitious binder including one or more of ordinary Portland cement, slag, or silica fume, and one or more of one or more of calcium-silicate-hydrates ("C-S-H") or calcium-aluminum-silicate-hydrates ("C-A-S-H") disposed in a liquid admixture. In some instances, the amount of the one or more of C-S-H or C-A-S-H in the liquid admixture may be between approximately 0.05% by weight of binder ("bwob") and approximately 2.5 wt % by weight of binder ("bwob").

In some implementations, the liquid admixture may further include one or more or elemental zinc or a nitrate salt of zinc, and water. In some examples, the pH of the liquid admixture may be between approximately 9 and approximately 13.5. In some other examples, the viscosity of the example liquid admixture may be between approximately 1 centipoise (cP) and approximately 2000 cP at a shear rate of 100 $s^{-1}$.

In some implementations, the density corresponding to the one or more of the calcium-silicate-hydrates ("C-S-H") or the calcium-aluminum-silicate-hydrates ("C-A-S-H") in the liquid admixture may be between approximately 1 g/L and approximately 700 g/L. In some implementations, a density corresponding to the one or more of the calcium-silicate-hydrates ("C-S-H") or the calcium-aluminum-silicate-hydrates ("C-A-S-H") in the liquid admixture may be approximately 52 g/L.

In some implementations, the liquid admixture may further include a carbon-based filler including flaky graphene and nodular graphene ("3DG carbons"). In some instances, the concentration of the 3DG carbons in the liquid admixture may be between approximately 10 g/liter and approximately 100 g/liter. In some other instances, the 3DG carbons may further include graphitic carbon. In some other instances, the amount of the aggregates in a concrete composition may be between approximately 10% by weight of binder ("bwob") and approximately 60% bwob.

Figure 10:
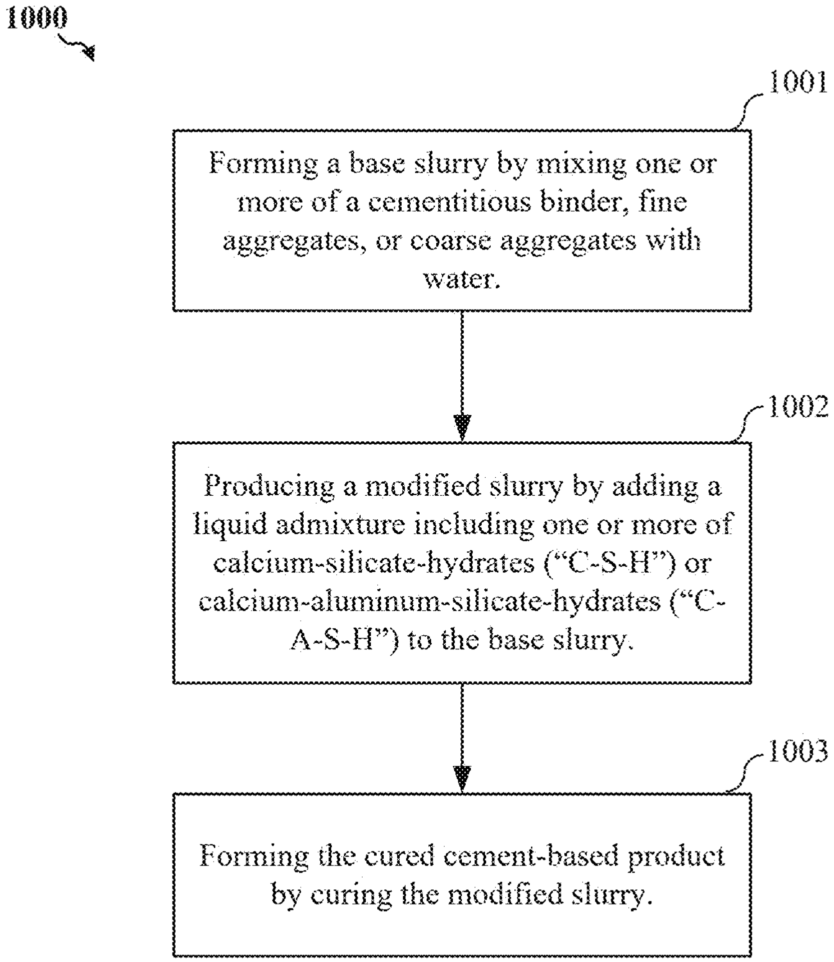
FIG. 10 shows a schematic diagram of an operation for making a cured cement-based product, according to some implementations.

FIG. 10 shows a schematic diagram of an operation 1000 for making a cured cement-based product, according to some implementations. As previously described herein, cement-based products include one or more of mortar, concrete, quick set cement products, high alumina cements, or oil field cements, among other similar non-limiting examples. In some implementations, operation 1000 may begin at 1001 with forming a base slurry by mixing one or more of a cementitious binder, fine aggregates, or coarse aggregates with water. In some instances, operation 1000 may continue at 1002 with producing a modified slurry by adding a liquid admixture including one or more of calcium-silicate-hydrates ("C-S-H") or calcium-aluminum-silicate-hydrates ("C-A-S-H") to the base slurry. In some instances, operation 1000 may continue at 1003 with forming the cured cement-based product by curing the modified slurry.

In some implementations, the liquid admixture may further include a carbon-based filler including flaky graphene and nodular graphene ("3DG carbons"). In some instances, the concentration of the carbon-based filler in the liquid admixture may be between approximately 10 g/liter and approximately 100 g/liter. Additional details related to the 3DG carbons were previously described in this disclosure. In some instances, the carbon-based filler may further include graphitic carbon.

In some implementations, the liquid admixture may further include one or more of elemental zinc or a nitrate salt including zinc, and water. In some instances, the pH of the liquid admixture may be between approximately 9.5 and approximately 13.

In some implementations, the producing the modified slurry at 1002 may include adding the liquid admixture at a concentration between approximately 0.05 wt % by weight of binder ("bwob") and approximately 2.5 wt % bwob. In some examples, the cementitious binder may include one or more of ordinary Portland cement ("OPC") or slag. In some other examples, the cured cement-based product may include one or more of mortar or concrete.

Figure 11:
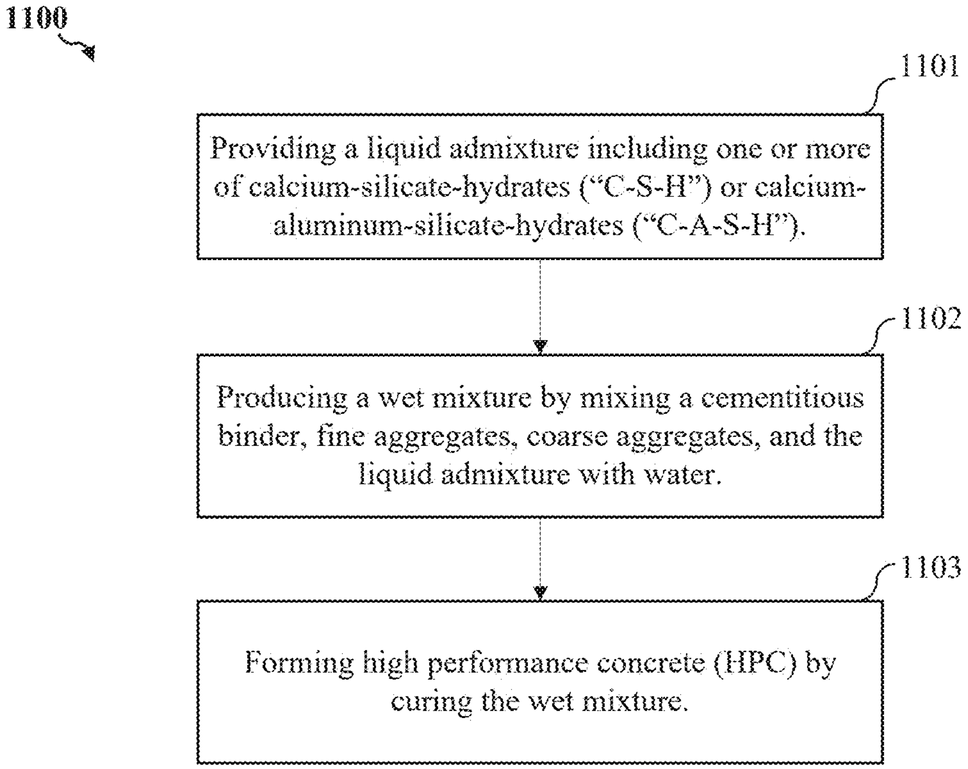
FIG. 11 shows a schematic diagram of an operation for forming high performance concrete (HPC), according to some implementations.

FIG. 11 shows a schematic diagram of an operation 1100 for forming high performance concrete ("HPC"), according to some implementations. In some implementations, operation 1100 may begin at 1101 with providing a liquid admixture including one or more of calcium-silicate-hydrates ("C-S-H") or calcium-aluminum-silicate-hydrates ("C-A-S-H"). In some instances, operation 1100 may continue at 1102 with producing a wet mixture by mixing a cementitious binder, fine aggregates, coarse aggregates, and the liquid admixture with water.

In some implementations, the concentration of the liquid admixture may be approximately 1 wt % by weight of binder ("bwob"). In some other examples, the cementitious binder may be free of silica fume. In some examples, the cementitious binder may include one or more of ordinary Portland cement ("OPC") or slag. In some other examples, the cementitious binder may include approximately 67 wt % ordinary Portland cement, and approximately 32 wt % slag.

In some other implementations, the liquid admixture may further include one or more of elemental zinc or a nitrate salt including zinc and water. In some examples, the pH of the liquid admixture may be between approximately 9.5 and approximately 13.

In some implementations, operation 1100 may continue at 1103 with forming high performance concrete by curing the wet mixture. In some examples, the cured concrete may be characterized by a compressive strength measured using ASTM C39 at a hydration period of 28 days of at least approximately 10,440 psi (70 MPa).

In some implementations, the liquid admixture at 1101 may further include a carbon-based filler including flaky graphene and nodular graphene ("3DG carbons"). In some instances, the carbon-based filler may further include graphitic carbon. In some examples, a concentration of the carbon-based filler in the liquid admixture may be between approximately 10 g/liter and approximately 100 g/liter. In some other examples, the high performance concrete may be characterized by a compressive strength measured using ASTM C39 at a hydration period of 28 days of at least approximately 10,440 psi (70 MPa).

In some implementations, another liquid admixture associated with a cement-based product, may include one or more of calcium-silicate-hydrates ("C-S-H") or calcium-aluminum-silicate-hydrates ("C-A-S-H"), a carbon-based filler including flaky graphene and nodular ("3DG carbons") and water. In some instances, the carbon-based filler may further include graphitic carbon. In some examples, a concentration of the carbon-based filler in the liquid admixture may be between approximately 25 g/liter and approximately 100 g/liter. In some examples, the liquid admixture may further include one or more of elemental zinc or a nitrate salt including zinc. In some other examples, the atomic ratio of zinc to calcium in the liquid admixture may be between approximately 0.1:1 and approximately 1:1.

EXAMPLES

Example 1. Compressive Strength of Mortar Samples Formulated with Liquid Admixtures Including C-S-H, C-A-S-H, and 3DG Carbons Mortar supplied by Titan Materials was formulated with a liquid admixture including calcium-silicate-hydrates ("C-S-H"), calcium-aluminum-silicate-hydrates ("C-A-S-H") and 3DG carbons. The 3DG carbons included flaky graphene and nodular graphene as previously described herein. Mortar samples were prepared with a liquid admixture concentration of 1 wt % by weight of binder ("bwob") and 1.5 wt % bwob. The reference mortar sample did not include the liquid admixture. The compressive strength of the mortar samples was measured using standard test protocol "Standard Test Method for Compressive Strength of Hydraulic Cement Mortars," ASTM C109. Compressive strength was measured at hydration periods of 1 day, 7 days, and 28 days.

Figure 12:
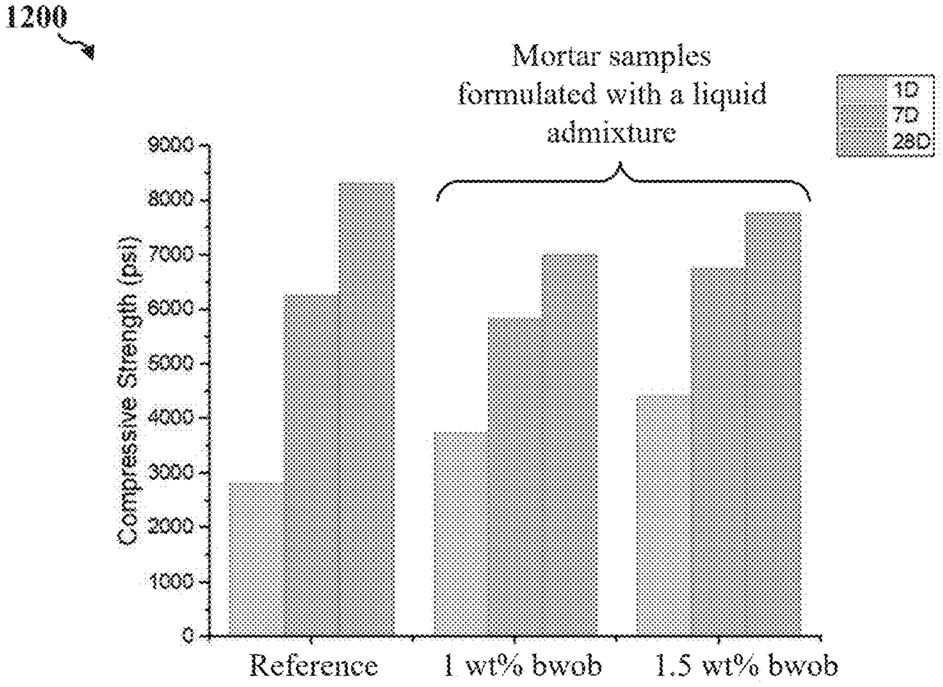
FIG. 12 shows a plot comparing the compressive strength of various mortar samples including calcium-silicate-hydrates (C-S-H), calcium-aluminum-silicate-hydrates (C-A-S-H), and 3DG carbons with the compressive strength of a reference sample, according to some implementations.

FIG. 12 shows a plot 1200 comparing the compressive strength of various mortar samples including C-S-H, C-A-S-H, and 3DG carbons with the compressive strength of a reference sample, according to some implementations. As can be seen, the mortar samples including the liquid admixture showed an increase in early compressive strength at 1 day compared to the compressive strength of the reference mortar sample. However, by 7 days, the enhancement in compressive strength relative to the compressive strength of the reference mortar sample was relatively muted. By 28 days, the compressive strength of the mortar samples including the liquid admixture fell somewhat below the compressive strength of the reference mortar sample.

Example 2. Compressive Strength of Mortar Samples Formulated with Liquid Admixtures Including Zinc Modulated C-S-H and C-A-S-H Mortar supplied by Titan Materials was formulated with a liquid admixture including zinc modulated calcium-silicate-hydrates ("C-S-H") and calcium-aluminum-silicate-hydrates ("C-A-S-H"). The reference mortar sample did not include the liquid admixture. The compressive strength of the mortar samples was measured using standard test protocol "Standard Test Method for Compressive Strength of Hydraulic Cement Mortars," ASTM C109. Compressive strength was measured at hydration periods of 1 day and 7 days. Samples with zinc to calcium atomic ratios of 0.1:1 and 0.5:1 were tested.

Figure 13A:
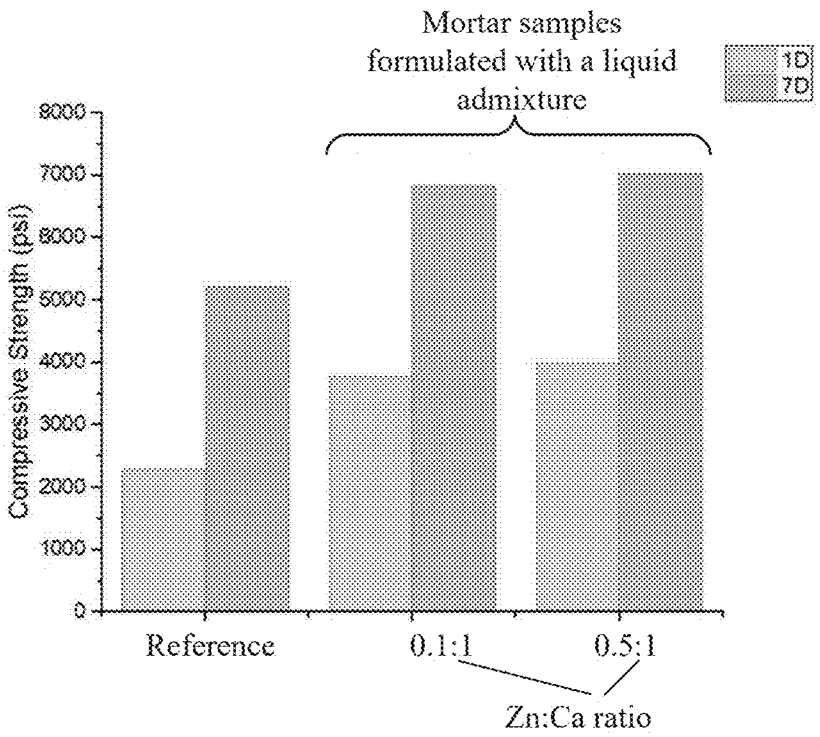
FIGS. 13A-13B show plots comparing the compressive strength of various mortar samples including zinc modulated C-S-H and C-A-S-H with the compressive strength of a reference sample, according to some implementations.
Figure 13B:
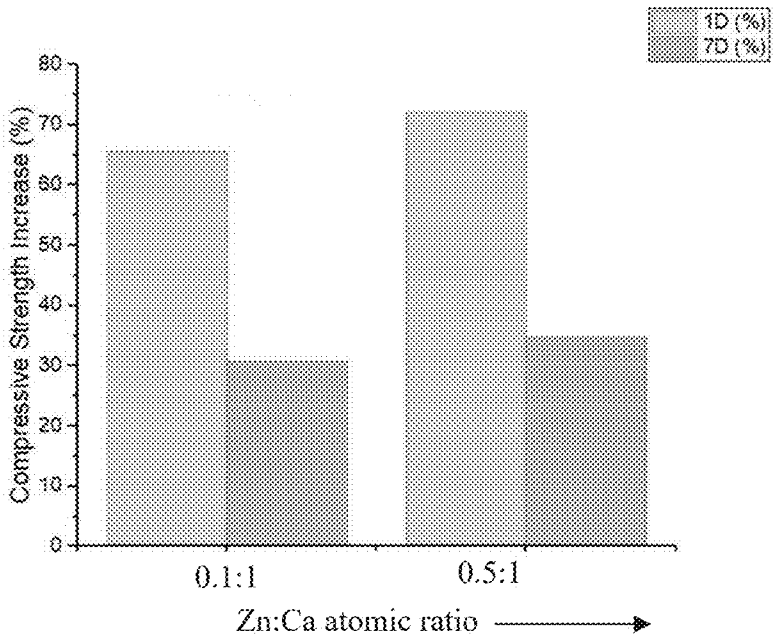

FIGS. 13A-13B show plots 1300A-1300B comparing the compressive strength of various mortar samples including zinc modulated C-S-H and C-A-S-H with the compressive strength of a reference sample, according to some implementations. As can be seen, the mortar samples including the liquid admixture showed an increase in compressive strength of approximately 30% at 7 days compared to the compressive strength of the reference mortar sample. Additionally, at 28 days (not shown in FIGS. 13A-13B), the mortar samples including the liquid admixture showed an increase in the compressive strength of between approximately 20% and approximately 24% compared to the compressive strength of the reference mortar sample.

Example 3. Compressive Strength of Concrete Including C-S-H, C-A-S-H, and 3DG Carbons Concrete supplied by Titan Materials was formulated with a liquid admixture including calcium-silicate-hydrates ("C-S-H"), calcium-aluminum-silicate-hydrates ("C-A-S-H") and 3DG carbons. The 3DG carbons included flaky graphene and nodular graphene as previously described herein. Concrete samples were prepared with a liquid admixture concentration of 1 wt % by weight of binder ("bwob") and 1.5 wt % bwob. The concrete samples were subjected to compressive strength testing using standard test protocol "Standard Test Method for Compressive Strength of Cylindrical Concrete Specimens," ASTM C39, at hydration periods of 1 day, 7 days, and 28 days. The reference concrete sample did not include the liquid admixture.

Figure 14A:
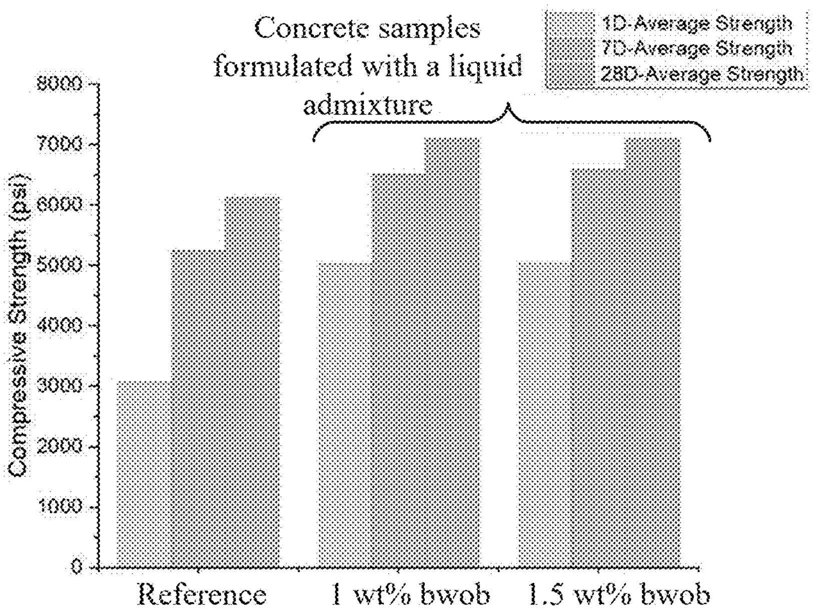
FIGS. 14A-14B show plots comparing the compressive strength of various concrete samples including C-S-H, C-A-S-H, and 3DG carbons with the compressive strength of a reference sample, according to some implementations.
Figure 14B:
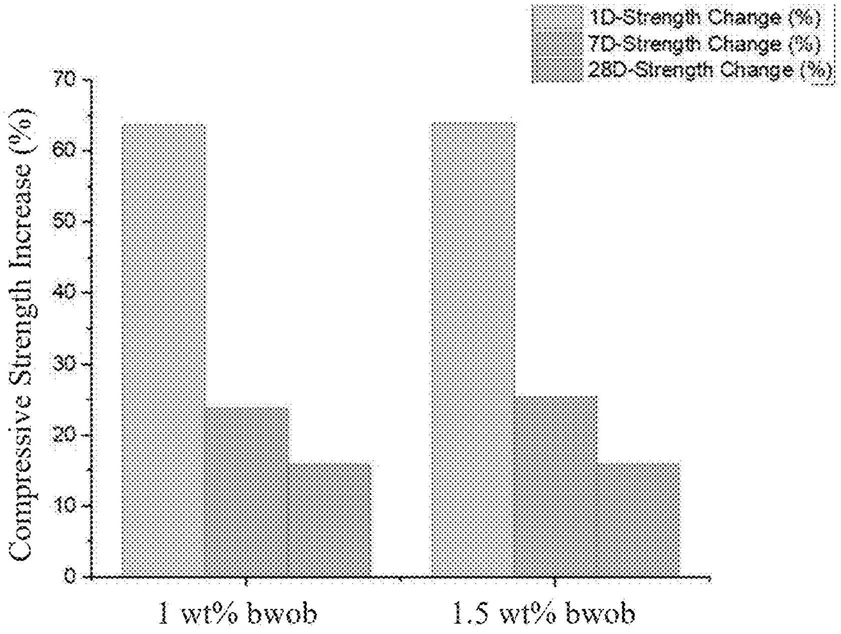

FIGS. 14A-14B show plots 1400A-1400B comparing the compressive strength of various concrete samples including C-S-H, C-A-S-H, and 3DG carbons with the compressive strength of a reference sample, according to some implementations. As can be seen, the concrete samples including the liquid admixture showed an increase in compressive strength of approximately 25% at 7 days compared to the compressive strength of the reference mortar sample. Additionally, at 28 days, the concrete samples including the liquid admixture showed an increase in the compressive strength of approximately 15% compared to the compressive strength of the reference mortar sample.

Example 4. Compressive Strength of Concrete Including Zinc Modulated C-S-H and C-A-S-H Concrete supplied by Titan Materials was formulated with a liquid admixture including zinc modulated calcium-silicate-hydrates ("C-S-H") and calcium-aluminum-silicate-hydrates ("C-A-S-H"). The reference concrete sample did not include the liquid admixture. Concrete samples were prepared with a liquid admixture concentration of 1 wt % by weight of binder ("bwob") and 1.25 wt % bwob. The concrete samples were subjected to compressive strength testing using standard test protocol "Standard Test Method for Compressive Strength of Cylindrical Concrete Specimens," ASTM C39, at hydration periods of 1 day and 7 days. The zinc to calcium atomic ratios associated with the liquid admixture was between approximately 0.1:1 and approximately 1:1.

Figure 15A:
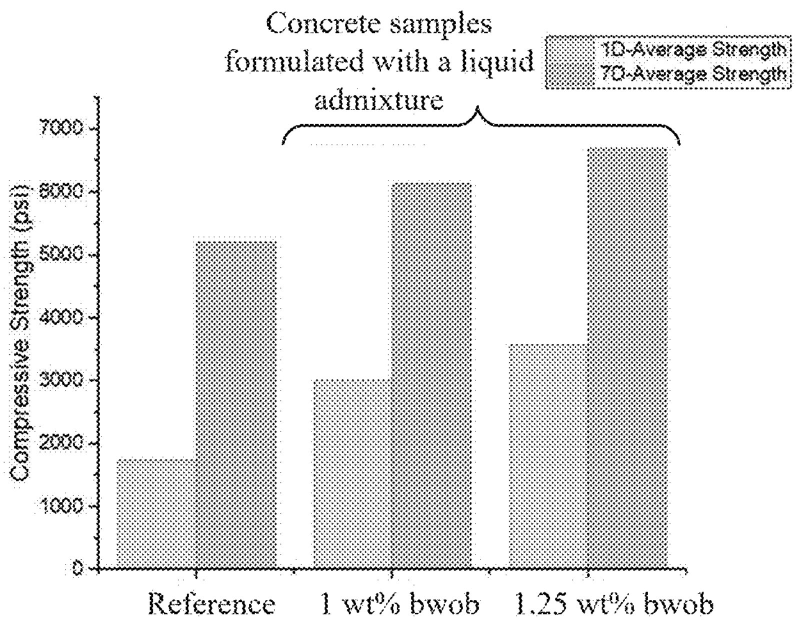
FIGS. 15A-15B show plots comparing the compressive strength of various concrete samples including zinc modulated C-S-H and C-A-S-H with the compressive strength of a reference sample, according to some implementations.
Figure 15B:
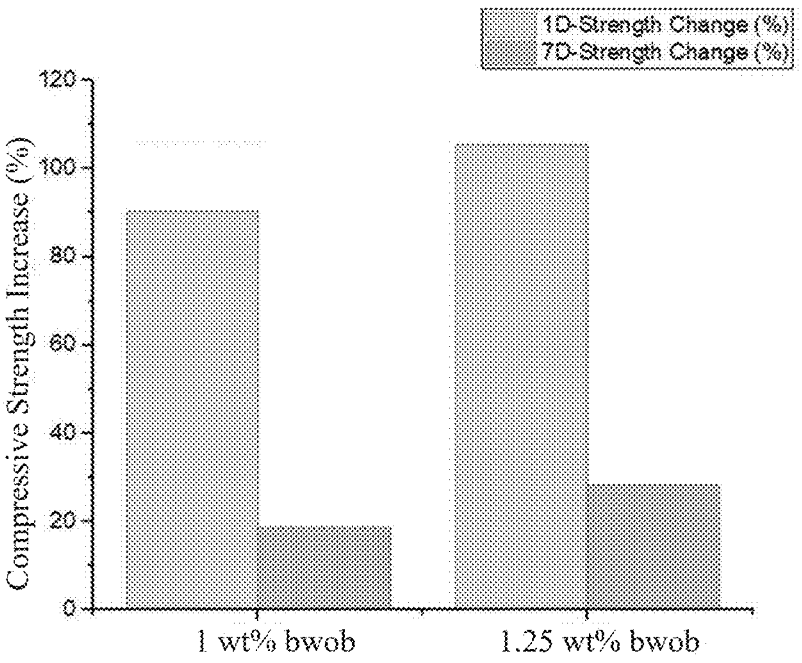

FIGS. 15A-15B show plots 1500A-1500B comparing the compressive strength of various concrete samples including zinc modulated C-S-H and C-A-S-H with the compressive strength of a reference sample, according to some implementations. As can be seen, the concrete samples including the liquid admixture showed an increase in the compressive strength of between approximately 20% and approximately 30% at 7 days compared to the compressive strength of the reference mortar sample.

Example 5. Compressive Strength of High Performance Concrete Including Zinc Modulated C-S-H and C-A-S-H High Performance Concrete ("HPC") was formulated with a liquid admixture including zinc modulated calcium-silicate-hydrates ("C-S-H") and calcium-aluminum-silicate-hydrates ("C-A-S-H"). Additionally, silica fume in the concrete formulation was replaced by sand at a replacement level of approximately 7 wt % by weight of binder ("bwob") and by the liquid admixture at a replacement level of approximately 1 wt % bwob. The reference HPC sample included silica fume and did not include sand and the liquid admixture. The concrete samples were subjected to compressive strength testing using standard test protocol "Standard Test Method for Compressive Strength of Cylindrical Concrete Specimens," ASTM C39, at hydration periods of 1 day and 7 days. The zinc to calcium atomic ratios associated with the liquid admixture was between approximately 0.1:1 and approximately 1:1.

Figure 16:
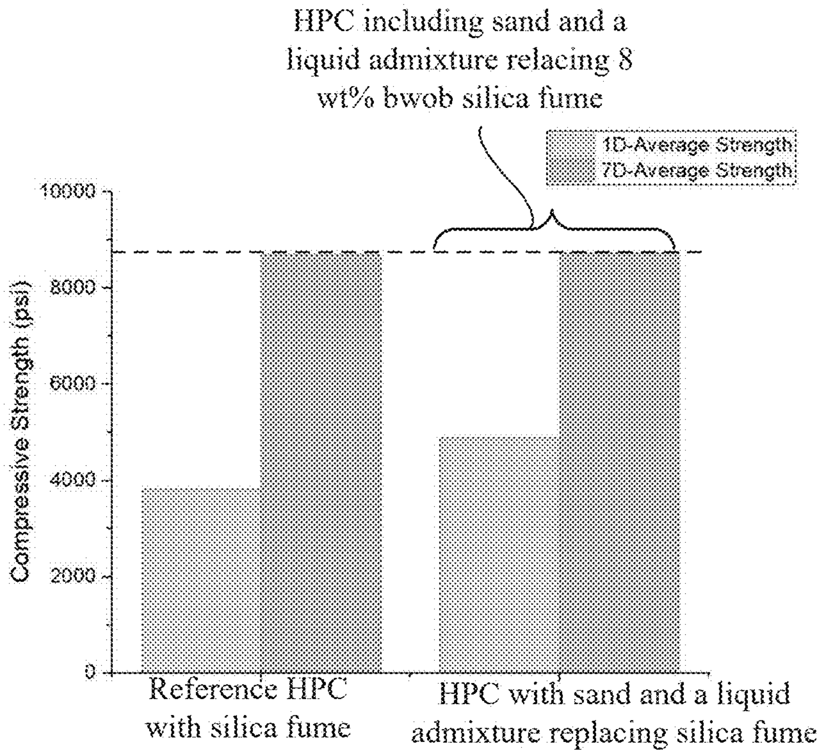
FIG. 16 shows a plot comparing the compressive strength of concrete samples including zinc modulated C-S-H and C-A-S-H with the compressive strength of a reference sample, according to some implementations.

FIG. 16 shows a plot 1600 comparing the compressive strength of concrete samples including zinc modulated C-S-H and C-A-S-H with the compressive strength of a reference sample, according to some implementations. As can be seen, at 7 days, the compressive strength of the concrete samples including sand and the liquid admixture was at par with the compressive strength of the reference HPC. Accordingly, a combination of sand and zinc modulated C-S-H and C-A-S-H as described herein may replace the expensive silica fume in high performance concrete formulations at a combined replacement level of approximately 8 wt %.

Example 6. Testing of High Performance Concrete Including C-S-H, C-A-S-H, and 3DG Carbons High Performance Concrete ("HPC") was formulated with a liquid admixture including calcium-silicate-hydrates ("C-S-H"), calcium-aluminum-silicate-hydrates ("C-A-S-H") and 3DG carbons. The 3DG carbons included flaky graphene and nodular graphene as previously described herein. Additionally, silica fume in the concrete formulation was replaced by slag at a replacement level of approximately 7 wt % by weight of binder ("bwob"), and by the liquid admixture at a replacement level of approximately 1 wt % bwob. The cementitious binder composition associated with the concrete formulations was approximately 67 wt % OPC, 32 wt % slag, and 1 wt % bwob liquid admixture including C-S-H, C-A-S-H, and 3DG carbons.

The reference HPC sample included 8 wt % bwob silica fume and did not include slag and the liquid admixture. The cementitious binder composition associated with the reference HPC sample was approximately 67 wt % OPC, 25 wt % slag, and 8 wt % silica fume. The concrete samples were subjected to compressive strength testing using standard test protocol "Standard Test Method for Compressive Strength of Cylindrical Concrete Specimens," ASTM C39, at hydration periods of 1 day, 7 days, and 28 days.

Figure 17:
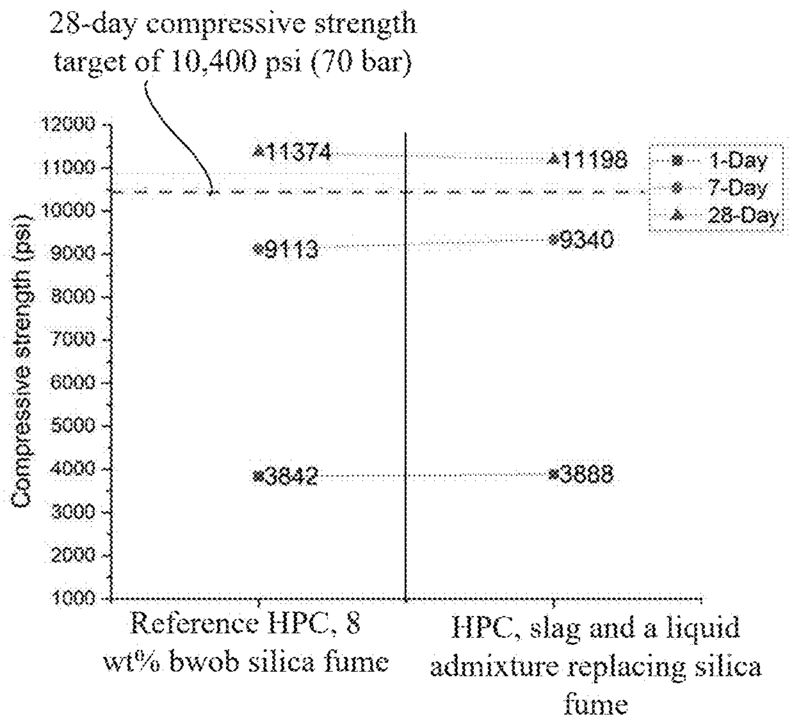
FIG. 17 shows a plot comparing the compressive strength of high performance concrete (HPC) samples including slag, C-S-H, C-A-S-H, and 3DG carbons with the compressive strength of a reference sample, according to some implementations.

FIG. 17 shows a plot 1700 comparing the compressive strength of high performance concrete ("HPC") test samples including slag, C-S-H, C-A-S-H and 3DG carbons with the compressive strength of a reference sample, according to some implementations. As can be seen, at 28 days, the compressive strength of the concrete test samples including slag and the liquid admixture, and free of silica fume, exceeded the target compressive strength of 10,400 psi (70 bar) for high performance concrete. Accordingly, a combination of slag and a liquid admixture including C-S-H, C-A-S-H and 3DG carbons as described herein may replace the expensive silica fume in high performance concrete formulations at a combined replacement level of approximately 8 wt %.

Additionally, 28-day HPC test sample disks of dimensions 50 mm thick×100 mm diameter were subjected to rapid chloride permeability test ("RCPT") using standard test protocol ASTM C1202. A "charge passed through" value of 100-1000 coulombs indicates low chloride ion permeability and excellent concrete durability. The HPC test sample disks including 1 wt % bwob of the liquid admixture including C-S-H, C-A-S-H and 3DG carbons was less than 1000 coulombs, which suggests excellent concrete durability. As described above, silica fume in the concrete formulation was replaced by slag at a replacement level of approximately 7 wt % by weight of binder ("bwob"), and by the liquid admixture at a replacement level of approximately 1 wt % bwob.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Unless otherwise specified in this disclosure, for construing the scope of the term "about" or "approximately," the error bounds associated with the values (dimensions, operating conditions etc.) disclosed is ±10% of the values indicated in this disclosure. As used herein, a "cement composition" also includes a "hydrating cement composition." Accordingly, the example 3DG carbons disclosed herein, including the surface functionalized 3DG carbons, may be dispersed in water and added to a cement composition or mortar composition during the hydration process. The error bounds associated with the values disclosed as percentages is ±1% of the percentages indicated. The word "substantially" used before a specific word includes the meanings "considerable in extent to that which is specified," and "largely but not wholly that which is specified."

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

What is claimed is:

1. A liquid admixture associated with a cement-based product, the liquid admixture including:

one or more of calcium-silicate-hydrates (C-S-H) or calcium-aluminum-silicate-hydrates (C-A-S-H);

one or more of elemental zinc or a nitrate salt including zinc, wherein an atomic ratio of the zinc to the calcium in the liquid admixture is between approximately 0.1:1 and approximately 1:1; and water, wherein a pH of the liquid admixture is between approximately 9.5 and approximately 13.

2. The liquid admixture of claim 1, wherein a density corresponding to the one or more of the calcium-silicate-hydrates (C-S-H) or the calcium-aluminum-silicate-hydrates (C-A-S-H) in the liquid admixture is between approximately 1 gram per liter of the liquid admixture (g/L) and approximately 700 g/L.

3. The liquid admixture of claim 1, wherein a mean chain length (MCL) of the silicate chains associated with the one or more of the calcium-silicate-hydrates (C-S-H) or the calcium-aluminum-silicate-hydrates (C-A-S-H) in the liquid admixture is between approximately 2.5 and approximately 5.

4. The liquid admixture of claim 1, wherein a viscosity of the liquid admixture, at a shear rate of 100 $s^{-1}$, is between approximately 1 centipoise (cP) and approximately 2000 cP.

5. The liquid admixture of claim 1, wherein the one or more of the calcium-silicate-hydrates (C-S-H) or the calcium-aluminum-silicate-hydrates (C-A-S-H) is disposed as nanoparticles.

6. The liquid admixture of claim 1, wherein an elemental composition of the liquid admixture includes:
- between approximately 1 atomic percentage (at %) and approximately 2.5 at % calcium;
- between approximately 0.05 at % and approximately 1 at % aluminum;
- between approximately 1 at % and approximately 1.5 at % silicon; and
- between approximately 0.1 at % and approximately 1 at % zinc.

7. The liquid admixture of claim 1, further including a superplasticizer.

8. The liquid admixture of claim 7, wherein the superplasticizer includes one or more of polycarboxylate ether, sulfonated naphthalene formaldehyde condensate, sulfonated melamine formaldehyde condensate, or acetone formaldehyde condensate.

9. The liquid admixture of claim 7, wherein an amount of the superplasticizer in the liquid admixture is between approximately 0.1 wt % and approximately 5 wt %.

10. The liquid admixture of claim 1, further including a carbon-based filler including flaky graphene and nodular graphene (3DG carbons), wherein a concentration of the carbon-based filler in the liquid admixture is between approximately 10 g/liter and approximately 100 g/liter.

11. The liquid admixture of claim 10, wherein the carbon-based filler is characterized by a Raman spectroscopy signature having an $I_D/I_G$ ratio between approximately 0.35 and approximately 0.56.

12. The liquid admixture of claim 10, wherein the carbon-based filler is characterized by a Raman spectroscopy signature having an $I_{2D}/I_G$ ratio between approximately 0.53 and approximately 0.7.

13. The liquid admixture of claim 10, wherein the flaky graphene includes between approximately 5 graphene layers and approximately 15 graphene layers.

14. The liquid admixture of claim 10, wherein the carbon-based filler further includes graphitic carbon.

15. The liquid admixture of claim 10, wherein the nodular graphene includes a plurality of carbon nano-onions (CNOs).

16. A method of making a cured cement-based product, the method including:
- forming a base slurry by mixing water with a cementitious binder and one or more of fine aggregates or coarse aggregates;
- providing a liquid admixture including:
  - one or more of calcium-silicate-hydrates (C-S-H) or calcium-aluminum-silicate-hydrates (C-A-S-H);
  - one or more of elemental zinc or a nitrate salt including zinc, wherein an atomic ratio of the zinc to the calcium in the liquid admixture is between approximately 0.1:1 and approximately 1:1; and
  - water, wherein a pH of the liquid admixture is between approximately 9.5 and approximately 13;
- producing a modified slurry by adding the liquid admixture to the base slurry; and
- forming the cured cement-based product by curing the modified slurry.

17. The method of claim 16, wherein the producing operation includes adding the liquid admixture at a concentration between approximately 0.05 wt % by weight of binder (bwob) and approximately 2.5 wt % bwob.

18. The method of claim 16, wherein the cementitious binder includes one or more of ordinary Portland cement (OPC) or slag.

19. The method of claim 16, wherein the liquid admixture further includes a carbon-based filler comprising flaky graphene and nodular graphene (3DG carbons), wherein a concentration of the carbon-based filler in the liquid admixture is between approximately 10 g/liter and approximately 100 g/liter.

20. A method of forming high performance concrete, the method including:
- providing a liquid admixture including:
  - one or more of calcium-silicate-hydrates (C-S-H) or calcium-aluminum-silicate-hydrates (C-A-S-H);
  - one or more of elemental zinc or a nitrate salt including zinc, wherein an atomic ratio of the zinc to the calcium in the liquid admixture is between approximately 0.1:1 and approximately 1:1; and
  - water, wherein a pH of the liquid admixture is between approximately 9.5 and approximately 13; and
- producing a wet mixture by mixing a cementitious binder, fine aggregates, coarse aggregates, and the liquid admixture, wherein a concentration of the liquid admixture is approximately 1 wt % by weight of binder (bwob).

21. The method of claim 20, wherein the cementitious binder includes one or more of ordinary Portland cement (OPC) or slag, and wherein the cementitious binder is free of silica fume.

22. The method of claim 20, wherein the cementitious binder includes:
- approximately 67 wt % ordinary Portland cement; and
- approximately 32 wt % slag.

23. The method of claim 20, further including forming a cured concrete by curing the wet mixture, wherein the cured concrete is characterized by a compressive strength measured using ASTM C39 at a hydration period of 28 days of at least approximately 10,440 psi (70 MPa).

24. The method of claim 20, wherein the liquid admixture further includes a carbon-based filler including flaky graphene and nodular graphene, (3DG carbons), wherein a concentration of the carbon-based filler in the liquid admixture is between approximately 10 g/liter and approximately 100 g/liter.

25. The method of claim 24, further including forming cured concrete by curing the wet mixture, wherein the cured concrete is characterized by a compressive strength measured using ASTM C39 at a hydration period of 28 days of at least approximately 10,440 psi (70 MPa).

* * * * *